US011096218B2

United States Patent
Qian et al.

(10) Patent No.: US 11,096,218 B2
(45) Date of Patent: Aug. 17, 2021

(54) METHOD, BASE STATION APPARATUS AND USER EQUIPMENT FOR RANDOM ACCESS

(71) Applicant: Samsung Electronics Co., Ltd., Suwon-si (KR)

(72) Inventors: Chen Qian, Beijing (CN); Bin Yu, Beijing (CN); Di Su, Beijing (CN); Qi Xiong, Beijing (CN); Yingjie Zhang, Beijing (CN); Jingxing Fu, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 16/348,379

(22) PCT Filed: Nov. 24, 2017

(86) PCT No.: PCT/KR2017/013527
§ 371 (c)(1),
(2) Date: May 8, 2019

(87) PCT Pub. No.: WO2018/110857
PCT Pub. Date: Jun. 21, 2018

(65) Prior Publication Data
US 2020/0068616 A1 Feb. 27, 2020

(30) Foreign Application Priority Data

Dec. 12, 2016 (CN) .......................... 201611140544.3
Jun. 26, 2017 (CN) .......................... 201710496638.2
Aug. 9, 2017 (CN) .......................... 201710676278.4

(51) Int. Cl.
H04W 74/08 (2009.01)
H04W 16/28 (2009.01)
(Continued)

(52) U.S. Cl.
CPC ....... *H04W 74/0833* (2013.01); *H04W 16/28* (2013.01); *H04W 24/10* (2013.01);
(Continued)

(58) Field of Classification Search
CPC . H04W 74/0833; H04W 16/28; H04W 24/10; H04W 36/08; H04W 72/046; H04W 74/02; H04W 80/08
See application file for complete search history.

(56) References Cited

U.S. PATENT DOCUMENTS

2011/0292816 A1    12/2011  Lee et al.
2012/0142354 A1*    6/2012  Ahluwalia ............ H04W 74/04
                                                              455/436
(Continued)

FOREIGN PATENT DOCUMENTS

EP       3 048 851 A1    7/2016
KR    10-2016-0123096 A   10/2016
(Continued)

OTHER PUBLICATIONS

NTT Docomo et al, "Design for RACH Procedure for NR", 3GPP Draft, R1-167378, RACH Procedure for NR, 3rd Generation Partnership Project (3GPP), Mobile Competence Centre, 650, Route Des Lucioles, F-06921 Sophia-Antipolis Cedex, France vol. RAN WG1, 20160822-20160826, XP051133032, Aug. 13, 2016, Göteborg, Sweden.
(Continued)

*Primary Examiner* — Eric Myers
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to
(Continued)

intelligent services based on the 5G communication technology and the IoT-related technology, such as smart home, smart building, smart city, smart car, connected car, health care, digital education, smart retail, security and safety services. Compared to the prior art, the present invention transmits a multiple of subsequences in a preamble sequence at a multiple of random access transmission occasions by using design of random access channel structure so as to increase the success rate of the detection and access efficiency.

15 Claims, 13 Drawing Sheets

(51) Int. Cl.
  *H04W 24/10* (2009.01)
  *H04W 36/08* (2009.01)
  *H04W 72/04* (2009.01)
  *H04W 74/02* (2009.01)
  *H04W 80/08* (2009.01)

(52) U.S. Cl.
  CPC ......... *H04W 36/08* (2013.01); *H04W 72/046* (2013.01); *H04W 74/02* (2013.01); *H04W 80/08* (2013.01)

(56) References Cited

U.S. PATENT DOCUMENTS

| | | |
|---|---|---|
| 2014/0348051 A1 | 11/2014 | Park et al. |
| 2015/0326995 A1 | 11/2015 | Li et al. |
| 2016/0219569 A1 | 7/2016 | Kuo et al. |
| 2018/0123650 A1* | 5/2018 | Yu .................... H01Q 25/002 |
| 2019/0104549 A1 | 4/2019 | Deng et al. |

FOREIGN PATENT DOCUMENTS

| | | |
|---|---|---|
| WO | 2014/189286 A1 | 11/2014 |
| WO | 2016/086144 A1 | 6/2016 |

OTHER PUBLICATIONS

European Search Report dated Sep. 2, 2019, issued in European Patent Application No. 17880930.7.
AT&T, 'NR Random Access Procedure Design', R1-1612362, 3GPP TSG RAN WG1 Meeting #87, Reno, USA, Nov. 5, 2016.
NTT Docomo, Inc., 'Views on random access channel for NR', R1-1612708, 3GPP TSG RAN WG1 Meeting #87, Reno, USA, Nov. 4, 2016.
ZTE Corporation, 'Random access preamble structure and signaling', R1-1611271, 3GPP TSG RAN WG1 Meeting #87, Reno, USA, Nov. 5, 2016.

* cited by examiner

[Fig. 1]
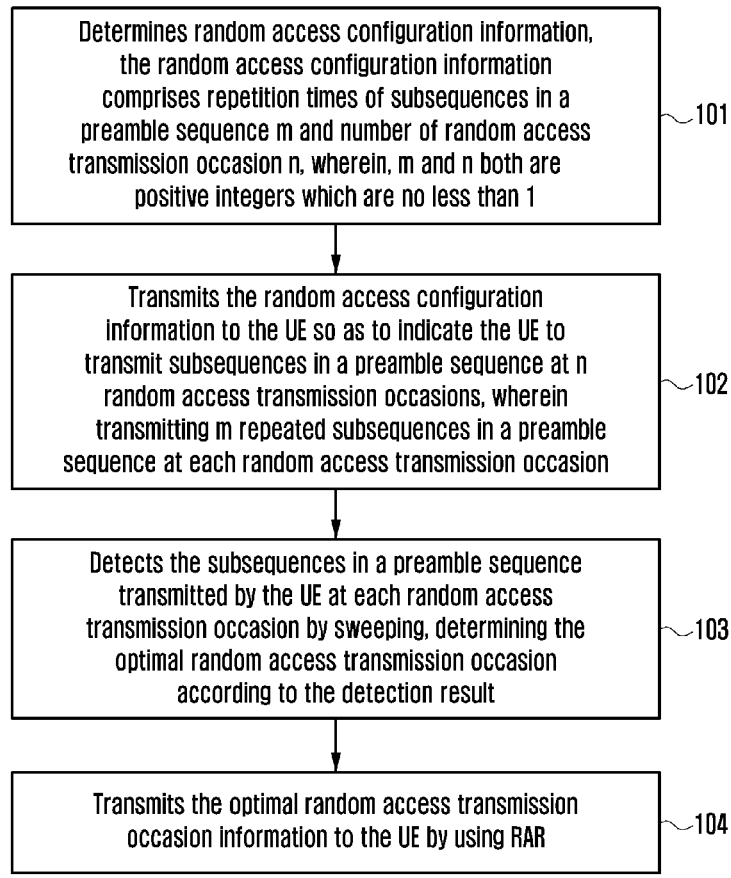
[Fig. 2]
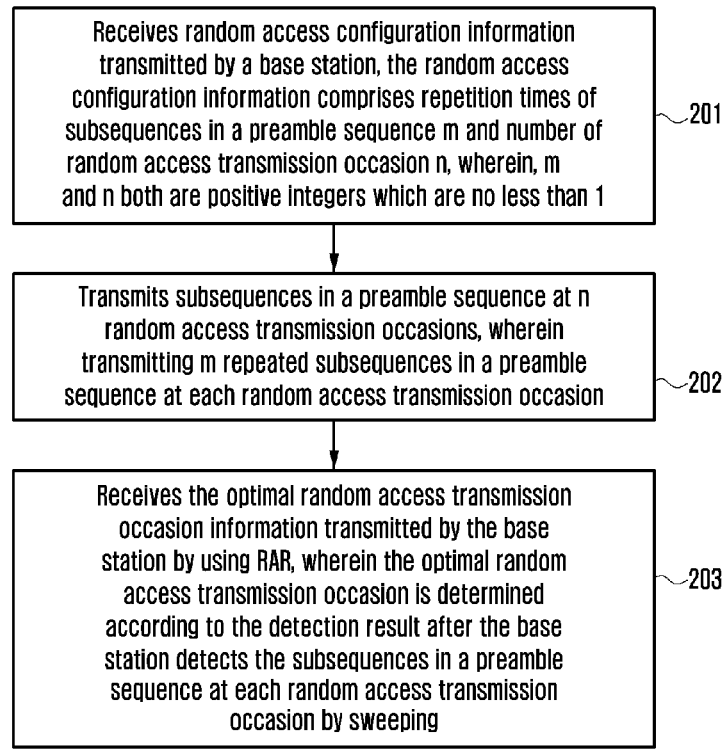

[Fig. 3]
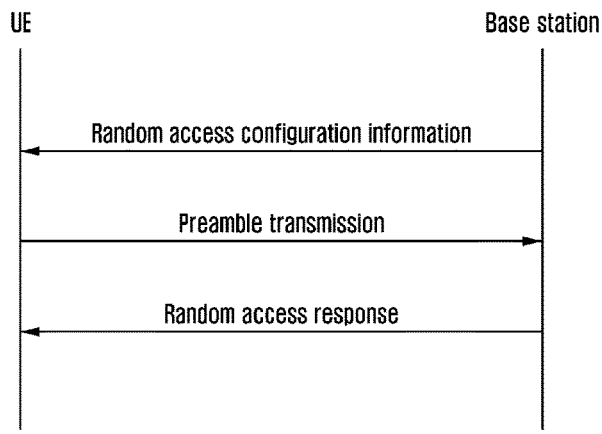
[Fig. 4]
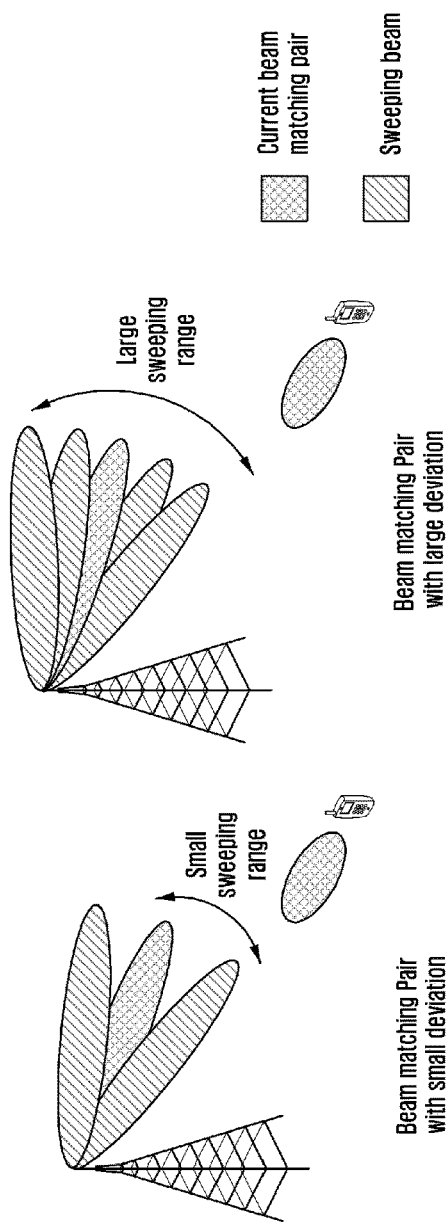

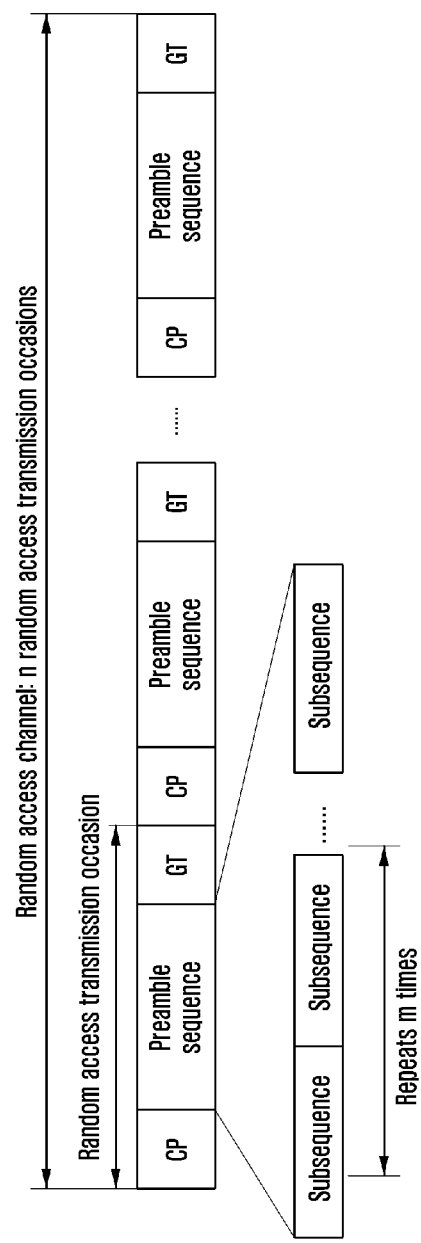
[Fig. 5]

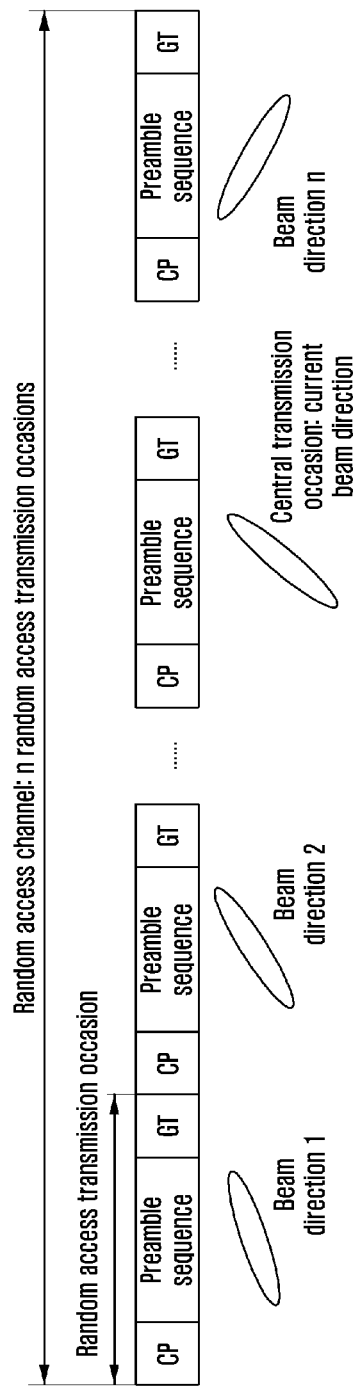
[Fig. 6]

[Fig. 7]
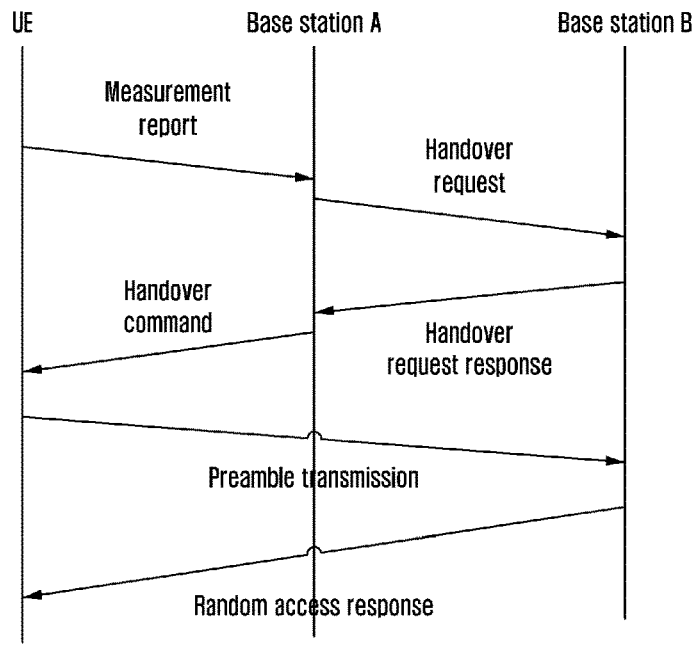
[Fig. 8]
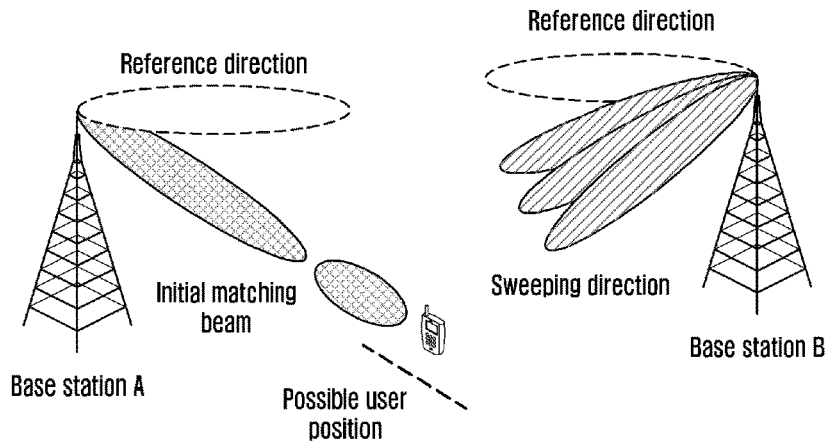
[Fig. 9]
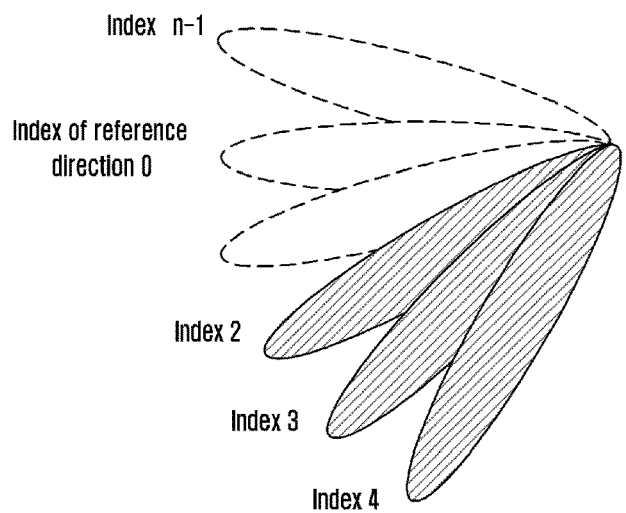

[Fig. 10]
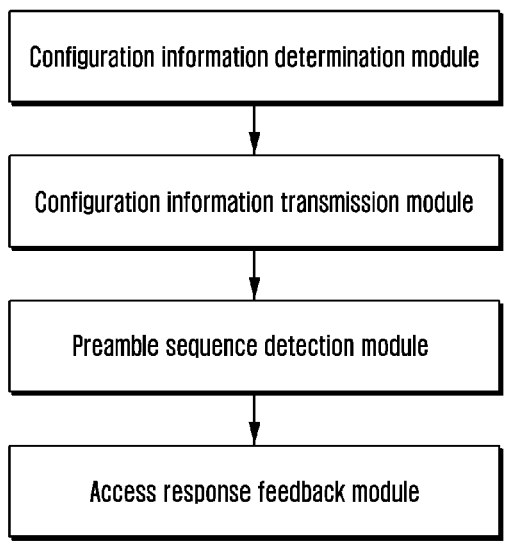
[Fig. 11]
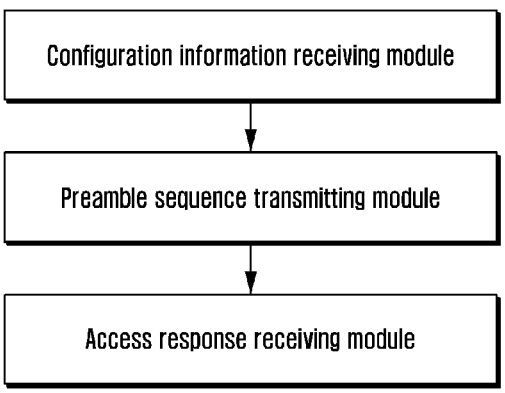

[Fig. 12]
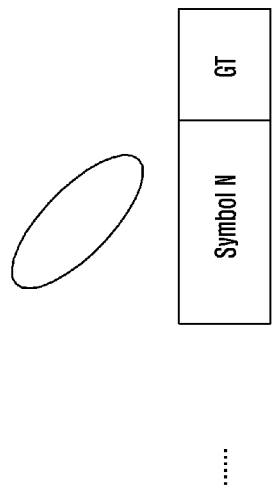
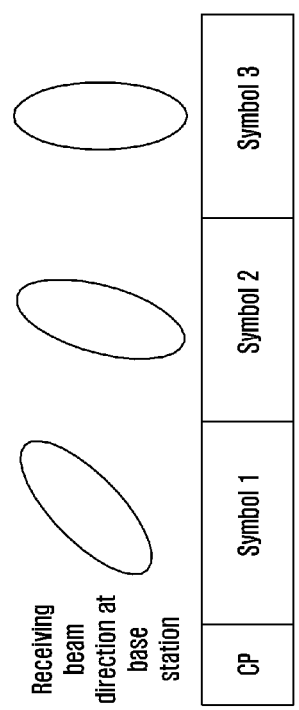
[Fig. 13]
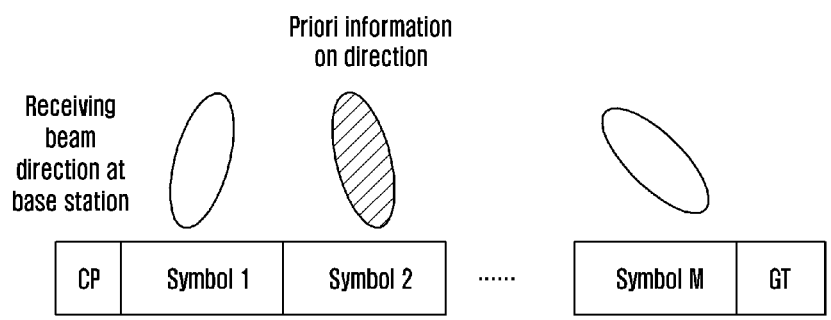

[Fig. 14]
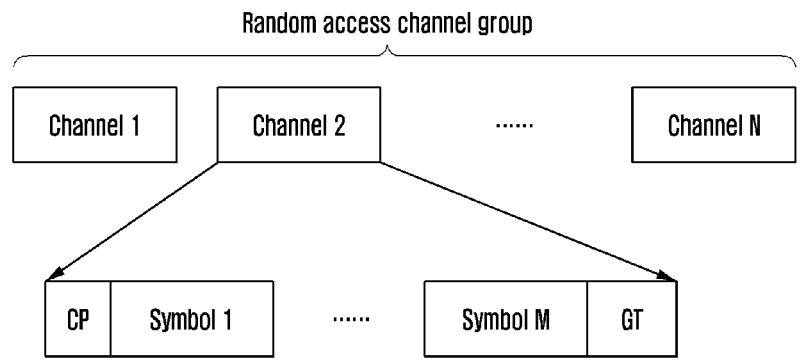
[Fig. 15]
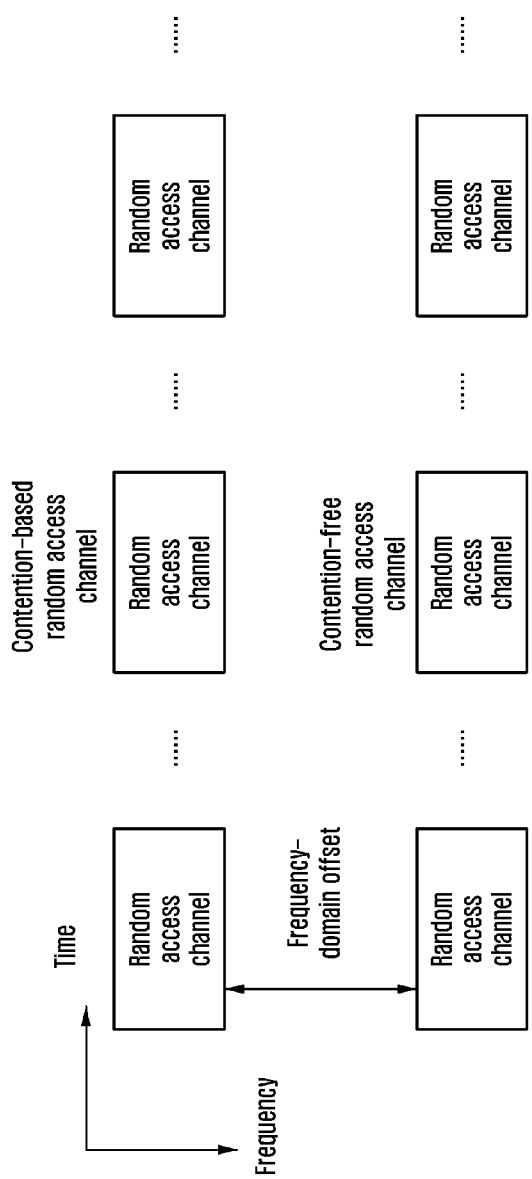

[Fig. 16]

| Downlink synchronization signal index 0 | Random access channel configuration information 0 | Random access preamble index 0 | Other information |
|---|---|---|---|
| Downlink synchronization signal index 1 | Random access channel configuration information 1 | Random access preamble index 1 | Other information |

......

| Downlink synchronization signal index N-1 | Random access channel configuration information N-1 | Random access preamble index N-1 | Other information |

[Fig. 17]

| Random access channel configuration information | Other information |
|---|---|
| Downlink synchronization signal index 0 | Random access preamble index 0 |
| Downlink synchronization signal index 1 | Random access preamble index 1 |

⋮

| Downlink synchronization signal index N-1 | Random access preamble index N-1 |

[Fig. 18]
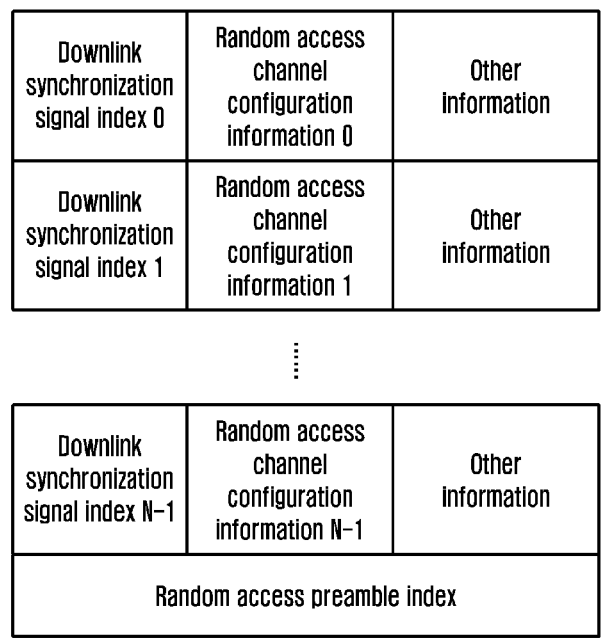

[Fig. 19]
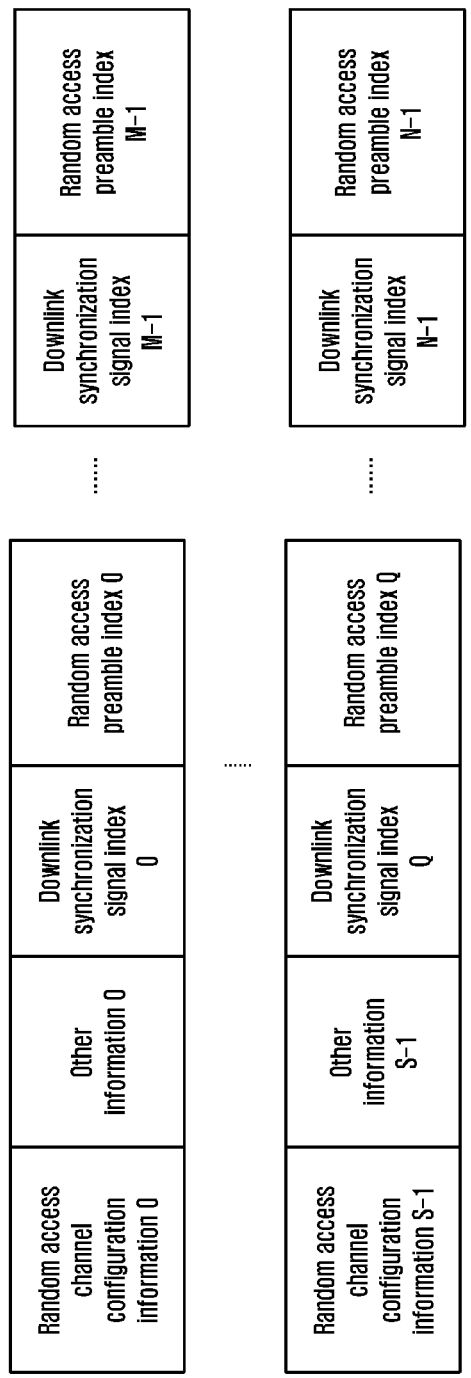

[Fig. 20]
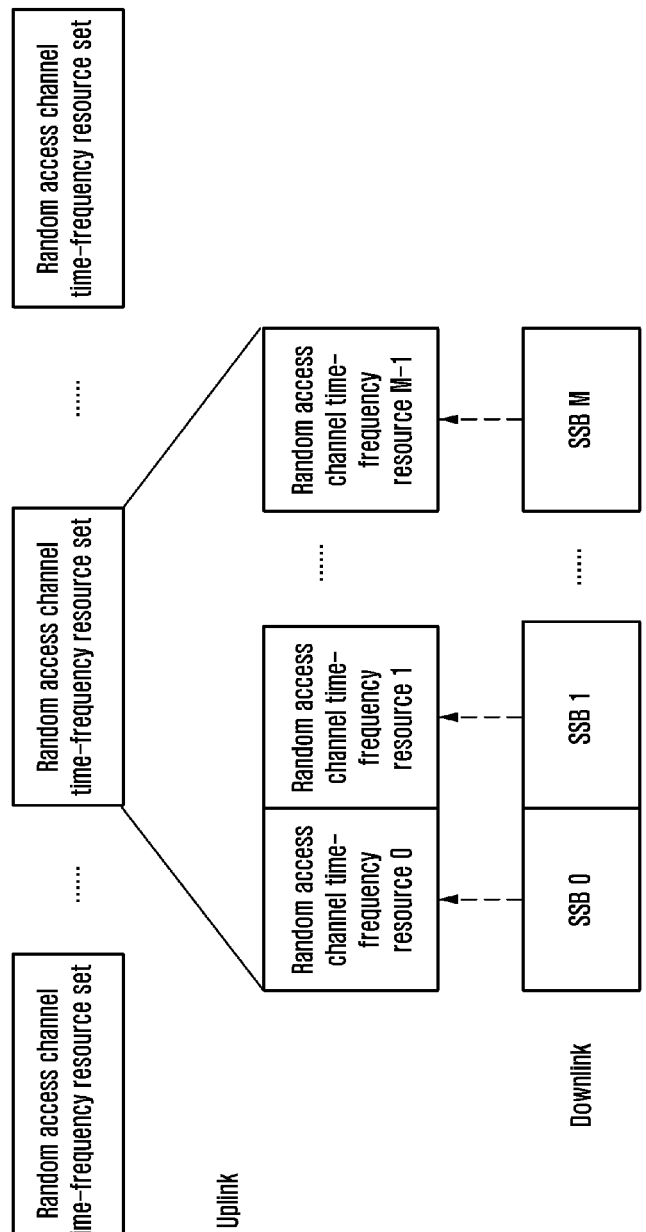
[Fig. 21]

[Fig. 22]
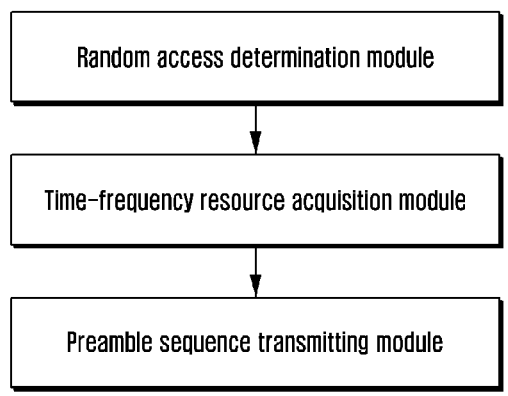
[Fig. 23]
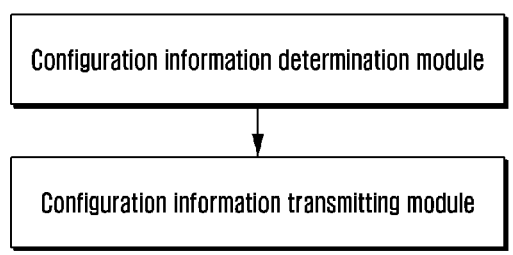

METHOD, BASE STATION APPARATUS AND USER EQUIPMENT FOR RANDOM ACCESS

TECHNICAL FIELD

The present application relates to the technical field of radio communication, and in particular to a method, base station apparatus and user equipment for random access.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The rapid development of information industry, particularly the increasing demand from the mobile Internet and the Internet of Things (IoT), brings about unprecedented challenges in the future mobile communications technology. The communications industry and academia are launching an extensive study of the fifth generation of mobile communications technology (5G), which is intended to address prominent issues such as significant improvement on system throughput, consistency of the user experience, scalability so as to support IoT, delay, energy efficiency, cost, network flexibility, support for new services and flexible spectrum utilization, etc.

Random Access (RA) is a key step for establishing communication link between the UE side and network side in the radio communication system, which is used for establishing uplink synchronization between a UE and a base station, and used for the base station to allocate the UE the ID which is used for identifying the UE. The performance of random access directly influences the user's experience. For a conventional wireless communication system, for example, Long Term Evolution (LTE) or Long Term Evolution-Advanced (LTE-A), the random access process is applied in various scenarios such as establishment of an initial link, cell handover, reestablishment of an uplink, Radio Resource Control (RRC) connection reestablishment, and is classified into contention-based random access and contention-free random access, depending upon whether a user equipment exclusively occupies preamble resources. Since the contention-free random access is applied in various scenarios such as cell handover, positioning and timing advance (TA) acquisition for small cell. In contention-free random access, the UE is in connected state, the preamble sequence for random access and random access channel resources are both configured by the base station by higher layer signaling configuration.

DISCLOSURE OF INVENTION

Technical Problem

Millimeter-wave communication is a key technique probably used by 5G. The Millimeter technique increases the carrier frequency into Millimeter-wave frequency band so that the available band is greatly increased; the transmission speed of system can be greatly increased. For against properties such as high fading and high loss in radio channel of Millimeter-wave band communication. The millimeter-wave communication normally uses beamforming technique, in other words, the millimeter-wave communication concentrates the beam power on a certain direction by using a weighting factor. While performing radio communication, the base station and the UE search optimal beam pair by ways such as polling so as to maximize a signal-to-noise ratio (SNR) at user side. Since the UE and the base station does not know the direction of the optimal beam pair while establishing a connection, the system needs to consume a great amount of communication resources for obtaining optimal beam pair information. The time of transmission and detection is prolonged, therefore the requirement of lower access delay and better access experience are not satisfied for 5G. As a result, the random access technique in the millimeter-wave communication, especially the contention-free random access confronts great challenges.

Given that, it is necessary to provide a method, base station apparatus and user equipment for random access which can solve the above technical problems.

Solution to Problem

The purpose of the present application is to provide a method, base station apparatus and user equipment based on contention-free random access for overcoming the defects in the prior art, which has low signaling interaction overhead, short service delay and simple data transmission process, and has ideal access efficiency.

For achieving the above purpose, the present invention provides a method for random access configuration, which comprises the following steps:

determining random access configuration information, the random access configuration information comprises repetition times of subsequences in a preamble sequence m and number of random access transmission occasion n, wherein, m and n both are positive integers which are no less than 1;

transmitting the random access configuration information to the user equipment (UE) so as to indicate the UE to transmit subsequences in a preamble sequence at n random access transmission occasions, wherein transmitting m repeated subsequences in a preamble sequence at each random access transmission occasion;

detecting the subsequences in a preamble sequence transmitted by the UE at each random access transmission occasion by sweeping, determining the optimal random access transmission occasion according to the detection result;

transmitting the optimal random access transmission occasion information to the UE by using Random Access Response (RAR).

Preferably, the step of transmit subsequences in a preamble sequence at n random access transmission occasions by the UE, comprises: indicating the UE to transmit, by using different transmitting beam directions, at n random access transmission occasions, subsequences in a preamble sequence by the UE;

the step of detecting the subsequences in a preamble sequence transmitted by the UE at each random access transmission occasion by sweeping, comprises: detecting the subsequences in a preamble sequence transmitted by the UE at each random access transmission occasion by using m different receiving beam directions by sweeping.

Preferably, the optimal random access transmission occasion information comprises: random access transmission occasion index corresponding to the optimal transmitting beam direction of the UE according to the detection result.

Preferably, before the step of determining the random access configuration information, comprises: receiving measurement result information of reference signal from the UE, deciding whether the UE is indicated to trigger random access according to measurement result in the measurement result information; if it is, performing the following steps.

Preferably, the measurement result information comprises beamforming gain information of the UE.

Preferably, the measurement result information contains the optimal transmitting beam direction information of this end, the m different receiving beam directions comprises optimal receiving beam direction of this end obtained according to the optimal transmitting beam direction of this end and beam reciprocity.

Preferably, the step of determining the random access configuration information, comprises: determining, according to any one or more parameters of beamforming gain strength with the UE, a signal-to-interference-plus-noise ratio (SINR) of receiving signal feedback by the UE and modulation and coding scheme (MCS), the repetition times of the subsequences in a preamble sequence m.

Preferably, the m different receiving beam directions comprise receiving beam direction currently deployed for the UE.

Preferably, the step of transmitting the random access configuration information to the UE, comprises: transmitting, by downlink control channel, downlink shared channel, physical broadcast channel or by higher layer signaling configuration, random access configuration information to the UE.

Preferably, before the step of determining the random access configuration in formation, comprises: receiving handover request transmitted by a first base station;

the step of transmitting the random access configuration information to the UE, comprises: transmitting, by handover request response, the random access configuration information to the first base station, indicating the first base station to transmit the random access configuration information to the UE by handover command.

Preferably, the step of determining the random access configuration information, comprises:

determining, according to geographic relation with the first base station, matching beam pair information between the base station and the UE carried in the handover request, cell radius of the base station, the repetition times of the subsequences in a preamble sequence m.

Preferably, the step of determining the random access configuration information, comprises: determining, according to matching beam pair information between the base station and the UE carried in the handover request and correspondence between this matching beam pair information and receiving beam direction range, the repetition times of the subsequences in a preamble sequence m.

Preferably, the step of determining the random access configuration information, comprises: determining, according to the maximum transmitting beam direction number of the UE carried in the handover request, the number of random access transmission occasion n.

For achieving the above purpose, the present invention further provides a method for random access request, which comprises the following steps:

receiving random access configuration information transmitted by a base station, the random access configuration information comprises repetition times of subsequences in a preamble sequence m and number of random access transmission occasion n, wherein, m and n both are positive integers which are no less than 1;

transmitting subsequences in a preamble sequence at n random access transmission occasions, wherein transmitting m repeated subsequences in a preamble sequence at each random access transmission occasion;

receiving optimal random access transmission occasion information transmitted by the base station by using Random Access Response (RAR), wherein, the optimal random access transmission occasion is determined according to the detection result after the base station detects the subsequences in a preamble sequence at each random access transmission occasion by sweeping.

Preferably, the step of transmitting subsequences in a preamble sequence at n random access transmission occasions, comprises: transmitting, by using different transmitting beam directions, at n random access transmission occasions, subsequences in a preamble sequence;

the step of detecting subsequences in a preamble sequence at each random access transmission occasion by sweeping by the UE, comprises: detecting the subsequences in a preamble sequence at each random access transmission occasion by using m different receiving beam directions by sweeping by the UE.

Preferably, before the step of receiving the random access configuration information transmitted by the base station, comprises:

transmitting measurement result information for reference signal so as to allow the receiving side to decide whether it is indicated to trigger random access according to the measurement result.

Preferably, the measurement result information comprises beamforming gain information of the UE.

Preferably, the random access configuration information further comprises transmitting beam direction range, the n different transmitting beam directions are within the transmitting beam direction range.

Preferably, the transmitting beam direction range is determined according to any one or more parameters of beamforming gain strength with the UE, a signal-to-interference-plus-noise ratio (SINR) of receiving signal feedback by the UE and modulation and coding scheme (MCS).

Preferably, the n different transmitting beam directions comprise transmitting beam direction currently deployed for the base station.

Preferably, the step of transmitting, by using different transmitting beam directions, at n random access transmission occasions, subsequences in a preamble sequence by the UE, comprises: transmitting, by using transmitting beam direction rotationally changed in a clockwise direction or in an anticlockwise direction successively and at n random access transmission occasions, subsequences in a preamble sequence.

Preferably, the $1^{th}$, $[n/2]^{th}$, $[(n+1)/2]^{th}$ or the $n^{th}$ of the transmitting beam direction rotationally changed in a clockwise direction or in an anticlockwise direction is the transmitting beam direction currently deployed for the base station, wherein, $[n/2]$ denotes to rounding n/2, $[(n+1)/2]^{th}$ denotes to rounding (n+1)/2.

Preferably, the subsequences in a preamble sequence transmitted at n random access transmission occasions are identical.

Preferably, the step of receiving the random access configuration information transmitted by the base station, comprises: receiving, by downlink control channel, downlink shared channel, physical broadcast channel or by higher layer signaling configuration, random access configuration information transmitted by the base station.

For achieving the above purpose, the present invention further provides a base station apparatus for random access configuration, which comprises:

a configuration information determination module, configured to determine random access configuration information, the random access configuration information comprises repetition times of subsequences in a preamble sequence m and number of random access transmission occasion n, wherein, m and n both are positive integers which are no less than 1;

a configuration information transmitting module, configured to transmit the random access configuration information to a user equipment (UE) so as to indicate the UE to transmit subsequences in a preamble sequence at n random access transmission occasions, wherein transmitting m repeated subsequences in a preamble sequence at each random access transmission occasion;

a preamble sequence detection module, configured to detect the subsequences in a preamble sequence transmitted by the UE by sweeping at each random access transmission occasion, determining the optimal random access transmission occasion according to the detection result;

an access response feedback module, configured to transmit the optimal random access transmission occasion information to the UE by using Random Access Response (RAR).

For achieving the above purpose, the present invention further provides a user equipment (UE) for random access request, which comprises:

a configuration information receiving module, configured to receive random access configuration information transmitted by a base station, the random access configuration information comprises repetition times of subsequences in a preamble sequence m and number of random access transmission occasion n, wherein, m and n both are positive integers which are no less than 1;

a preamble sequence transmission module, configured to the transmit subsequences in a preamble sequence at n random access transmission occasions, wherein transmitting m repeated subsequences in a preamble sequence at each random access transmission occasion;

an access response receiving module, configured to receive optimal random access transmission occasion information transmitted by the base station by using Random Access Response (RAR), and wherein, the optimal random access transmission occasion is determined according to the detection result after the base station detects the subsequences in a preamble sequence at each random access transmission occasion by sweeping.

Advantageous Effects of Invention

Compared to the prior art, the technical effect of the present invention comprises: by design of the random access channel structure, a multiple of subsequences in a preamble sequence are transmitted at a multiple of random access transmission occasions so as to perform detection. By doing this, the success rate of the detection and access efficiency are greatly increased.

The technical effect of the present invention further comprises: by combining the beam matching pair of the millimeter-wave communication and the contention-free random access of the radio communication system, the system band is increased; the transmission speed of the system is greatly increased; beam matching pair of the multi-beam communication is realized without increasing the interaction steps based on the initial communication interaction steps of the contention-free random access of the conventional radio communication system, the service delay and the signaling interaction overheads transmitted by the parameters are reduced, the system efficiency is greatly increased.

BRIEF DESCRIPTION OF DRAWINGS

To illustrate the technical means of the embodiments of the present invention clearly, the accompanying figures required to be used for the description in the embodiments will be simply introduced. Obviously, the accompanying figures described hereinafter are merely some embodiments of the present invention. For those skilled in the art, without paying out any inventive work, other accompanying drawings can be obtained according these accompanying drawings.

FIG. 1 is a schematic flowchart of a method for random access configuration according to the present invention;

FIG. 2 is a schematic flowchart of a method for random access request according to the present invention;

FIG. 3 is a schematic diagram of random access communication interaction of Embodiment 1 according to the present invention;

FIG. 4 is a schematic diagram of beam matching pair between the base station and the UE of Embodiment 1 according to the present invention;

FIG. 5 is a schematic diagram of random access channel structure of Embodiment 1 according to the present invention;

FIG. 6 is a schematic diagram of different transmitting beam directions of the UE of Embodiment 1 according to the present invention;

FIG. 7 is a schematic diagram of random access communication interaction of Embodiment 2 according to the present invention;

FIG. 8 is a schematic diagram that base station B determines transmitting beam direction range of Embodiment 2 according to the present invention;

FIG. 9 is a schematic diagram of beam direction index of Embodiment 2 according to the present invention;

FIG. 10 is a module diagram of the base station apparatus for random access configuration according to the present invention;

FIG. 11 is a module diagram of the user equipment for random access configuration according to the present invention.

FIG. 12 shows an example of preamble sequence format according to an embodiment of the present invention.

FIG. 13 shows an example of preamble sequence format according to an embodiment of the present invention.

FIG. 14 shows an example of random access channel group structure according to an embodiment of the present invention.

FIG. 15 shows an example of random access channel configuration according to an embodiment of the present invention.

FIG. 16 shows an example of downlink control information structure according to an embodiment of the present invention.

FIG. 17 shows an example of downlink control information structure according to an embodiment of the present invention.

FIG. 18 shows an example of downlink control information structure according to an embodiment of the present invention.

FIG. 19 shows an example of downlink control information structure according to an embodiment of the present invention.

FIG. 20 shows an example of random access channel resource set according to an embodiment of the present invention.

FIG. 21 shows an example of random access channel resource indication structure according to an embodiment of the present invention.

FIG. 22 shows an example structure of a user equipment according to an embodiment of the present invention.

FIG. 23 shows an example structure of a base station according to an embodiment of the present invention.

MODE FOR THE INVENTION

To make the objectives, technical scheme and advantages of the present application clearer for those skilled in the art, the present application will be further described below completely and in details with reference to the accompanying drawings.

The flow described in the specification, claims and the above accompanying drawing of the present invention contains a multiple of operations presented in a specific order. However, it shall clearly understand that, these operations can be executed or executed in parallel in a different order compared with the order presented in the present invention. The operation numbers such as 101, 102 or others are merely used for distinguishing each different operation. The operation numbers themselves does not represent any execution order. In addition, these flows can include more or less operations, which can be executed or executed in parallel in an order. It is to be noted that, the descriptions "the first", "the second" and or others descriptions in the present invention are used for distinguishing the different information, equipments, modules or others, which do not represent any sequential order, and do not limit "the first" and "the second" are different types.

The technical scheme in the embodiments of the present invention will be further described clearly and completely in combination with the accompanying drawings in the embodiments of the present invention below. Apparently, the described embodiments are merely parts of the embodiments of the present invention, not the all embodiments. Based on the embodiments of the present invention, all the other embodiments acquired by those skilled in the art without paying out any inventive work belong to the protection scope of the present invention.

The communication system according to the embodiments operates in a high-frequency band (for instance, millimeter-wave frequency band) environment. For ensuring the coverage rate, the communication system uses beamforming technique, the base station and the UE uses matching beam pair to acquire beamforming gain, so as to overcome the major path loss in high-frequency band. The method for random access according to the embodiments in the present application belongs to contention-free random access method.

Please refer to FIG. 1, the method for random access configuration according to the embodiment comprises the following steps:

Step 101, determines random access configuration information, the random access configuration information comprises repetition times of subsequences in a preamble sequence m and number of random access transmission occasion n, wherein, m and n both are positive integers which are no less than 1;

Step 102, transmits the random access configuration information to the user equipment (UE) so as to indicate the UE to transmit subsequences in a preamble sequence at n random access transmission occasions, wherein transmitting m repeated subsequences in a preamble sequence at each random access transmission occasion;

Step 103, detects the subsequences in a preamble sequence transmitted by the UE at each random access transmission occasion by sweeping, determining the optimal random access transmission occasion according to the detection result;

Step 104, transmits the optimal random access transmission occasion information to the UE by using Random Access Response (RAR).

Please refer to FIG. 2, the method for random access request according to the embodiment comprises the following steps:

Step 201, receives random access configuration information transmitted by a base station, the random access configuration information comprises repetition times of subsequences in a preamble sequence m and number of random access transmission occasion n, wherein, m and n both are positive integers which are no less than 1;

Step 202, transmits subsequences in a preamble sequence at n random access transmission occasions, wherein transmitting m repeated subsequences in a preamble sequence at each random access transmission occasion;

Step 203, receives the optimal random access transmission occasion information transmitted by the base station by using RAR, wherein, the optimal random access transmission occasion is determined according to the detection result after the base station detects the subsequences in a preamble sequence at each random access transmission occasion by sweeping.

Embodiment 1

Please refer to FIG. 3, taking the UE random access scenario that the beam matching pair between the base station and the UE are not aligned accurately and the optimal beamforming gain is not able to be obtained while the base station and the UE are in RRC connected state as an example, so as to illustrate how to complete the whole process of random access by the method for random access configuration according to the implementation cooperated with the method for random access request according to the implementation.

It is to be noted that, the implementation can also be applied into other scenarios of contention-free random access, such as: the UE being in RRC connected state, receiving downlink data and uplink being out of step; positioning, TA acquisition for small cell or other scenarios.

Step 301, the UE periodically measures the measurement reference signal transmitted by the base station, and feed the measurement result to the base station.

Step 302, the base station determines whether to indicate UE to trigger random access according to the measurement result feedback by the UE, if it is, then the base station initializes the contention-free random access for the UE.

In this embodiment, the measurement result comprises the beamforming gain information of the UE. If the base station finds out that the beam matching pair between the base station and the UE is not aligned accurately according to the measurement result reported by the UE, and cannot acquire the optimal beamforming gain, then the base station initializes the contention-free random access for the UE.

Step 303, the base station determines random access configuration information.

Random access configuration information comprises preamble sequence, random access channel time-frequency resource, base station receiving beam direction range, UE transmitting beam direction range, the repetition times of the subsequences in a preamble sequence m (m is a positive integer which is no less than 1), number of random access transmission occasions n (n is a positive integer which is no less than 1) and other conventional parameter information required by the random access. Random access configuration information is used to determine the structure of the random access channel.

The preamble sequence and the random access channel time-frequency resource are allocated by the base station to the UE.

Please refer to FIG. 4, the base station receiving beam direction range is the beam sweeping range used when the base station receives the preamble sequence, the UE transmitting beam direction range is the beam transmitting range used when the UE transmits the preamble sequence. The base station receiving beam direction range and the UE transmitting beam direction range are determined according to the beamforming gain strength with UE by the base station. Specifically, the strength of the beamforming gain is determined according to the beam matching pair accuracy. If the beam matching pair has a large deviation, then the base station is required to receive by sweeping on a larger beam sweeping range, the UE transmits on a larger beam transmitting range; otherwise, if the beam matching pair has a small deviation, then the base station is only required to receive by sweeping on a smaller beam sweeping range, then the UE is only required to transmit on a smaller beam transmitting range.

In the left portion of FIG. 4, the base station finds out the beam matching pair between the base station and the UE is very accurate according to the beamforming gain with the UE. Therefore, the base station can receive by sweeping in a smaller beam sweeping direction while the base station receives the preamble sequence, and the UE can transmit in a small beam transmitting direction while the UE transmits the preamble sequence. However, in the right portion of FIG. 4, the base station finds out the beam matching pair between the base station and the UE is not accurate according to the measurement on the beamforming gain, then the base station is required to receive by sweeping in a larger beam sweeping direction while the base station receives the preamble sequence, and the UE is required to transmit in a larger beam transmitting direction while the UE transmits the preamble sequence.

Please refer to FIG. 5, FIG. 5 shows the contention-free random access channel structure of the implementation. The contention-free random access channel is consisted of n random access transmission occasions. Each random access transmission occasion is consisted of Cycle Prefix (CP), preamble sequence and Guard Time (GT) (wherein, the GT of the random access transmission occasion can be omitted, however, the GT between the last random access transmission occasion and the data channel is required to be retained). The preamble sequence in each random access transmission occasion is obtained by the repetition of m same subsequences in a preamble sequence.

Since the repetition times of subsequences in a preamble sequence m is determined by the base station receiving beam direction range, and random access transmission occasion n is determined by the UE transmitting beam direction range, however, the base station receiving beam direction range and the UE transmitting beam direction range are determined by the beamforming gain strength, therefore, the repetition times of subsequences in a preamble sequence m and number of random access transmission occasion n are determined by the base station according to the beamforming gain strength with the UE. Table 1 shows an instance of a way of determining the repetition times of subsequences in a preamble sequence m and number of random access transmission occasion n according to beamforming gain strength.

TABLE 1

Instance of determining m and n
according to the beamforming gain

| Beamforming gain | Repetition times of subsequences in a preamble sequence m | Number of random access transmission occasion n |
| --- | --- | --- |
| Range 1 | Value m1 | Value n1 |
| Range 2 | Value m2 | Value n2 |
| Range 3 | Value m3 | Value n3 |

In way of table 1, the base station inquires pre-stored correspondence table according to the range of beamforming gain, so as to acquire repetition times of subsequences in a preamble sequence m and number of random access transmission occasion n. Moreover, besides beamforming gain parameter, the base station can determine base station receiving beam direction range and UE transmitting beam direction range according to parameters such as the SINR of the receiving signal feedback by the UE and modulation and coding scheme (MCS), so as to further determine the repetition times of subsequences in a preamble sequence m and the number of random access transmission occasion n. In the instance of table 1, the base station simultaneously determines both the repetition times of subsequences in a preamble sequence m and the number of random access transmission occasion n according to the beamforming gain range; in other ways, the base station can simultaneously or separately determine the repetition times of subsequences in a preamble sequence m and the number of random access transmission occasion n according to any one or more parameters of beamforming gain strength, the SINR of receiving signal feedback by the UE and MCS.

Step 304, the base station transmits the random access configuration information to the UE.

The base station transmits the random access configuration information to the UE by the downlink control channel, the downlink shared channel or the physical broadcast channel, so as to inform the UE to trigger random access request.

Step 305, the UE receives the random access configuration information transmitted by the base station, and transmits the random access request containing the preamble sequence to the base station.

After receiving the random access configuration information, the UE trigger a random access request to the base station on the dedicated random access channel time-frequency resource according to parameters such as the dedicated preamble sequence in the random access configuration information, the repetition times of subsequences in a preamble sequence m and the number of random access transmission occasion n.

Please refer to FIG. 6, the UE transmits subsequences in a preamble sequence at n random access transmission occasions by using different transmitting beam direction, wherein transmitting m repeated subsequences in a preamble sequence at each random access transmission occasion, the subsequences in a preamble sequence at each random access transmission occasion are identical, and the different transmitting beam directions used by the UE are within the UE transmitting beam direction range determined in step 303. When n=1, the UE uses the transmitting beam direction current deployed to transmit subsequences in a preamble sequence. When n>1, the UE transmits the subsequences in a preamble sequence by using transmitting beam direction rotationally changed in a clockwise direction or in an anticlockwise direction successively at n random access transmission occasions, and the UE transmits the sub-sequences in a preamble sequence at one of the random access transmission occasions by using current deployed transmitting beam direction. Preferably, the UE transmits the sub-sequences in a preamble sequence at Ph (starting point), $[n/2]^{th}$ (middle position, $[n/2]$ denotes rounding n/2), $[(n+1)/2]^{th}$ (middle position, $[(n+1)/2]$ denotes rounding (n+1)/2) or $n^{th}$ (ending point) random access transmission occasion by using the current deployed transmitting beam direction. FIG. 6 shows the condition that the $[n/2]^{th}$ or $[(n+1)/2]^{th}$ random access transmission occasion is the current deployed transmitting beam direction, in other words, the current deployed transmitting beam direction is the center of transmitting beam direction range, then the UE selects n−1 transmitting beam directions on both sides of the center again to transmit random access transmission occasion signal.

Step 306, the base station detects preamble sequence, and receives random access request of the UE.

The base station detects the preamble sequence transmitted by the UE according to the beam sweeping or other ways. The base station detects m subsequences in a preamble sequence transmitted by the UE by sweeping at each random access transmission occasion and by using m different receiving beam directions, and determines the optimal receiving beam direction of the base station and the optimal transmitting beam direction of the UE according to the detection result. Wherein, the m different receiving beam directions are within the base station receiving beam direction range determined in step 303. When m=1, the base station receives subsequences in a preamble sequence by using the currently deployed receiving beam direction. When m>1, the base station receives subsequences in a preamble sequence by using m receiving beam directions rotationally changed in a clockwise direction or in an anticlockwise direction successively and at each random access transmission occasions, and wherein one receiving beam direction is the currently deployed receiving beam direction for the UE. Preferably, $[n/2]^{th}$ (middle position, $[n/2]$ denotes rounding n/2) or $[(n+1)/2]^{th}$ (middle position, $[(n+1)/2]$ denotes rounding (n+1)/2) receiving beam direction is the currently deployed receiving beam direction for the UE, in other words, for the Ph random access transmission occasion, the base station takes the receiving beam direction current deployed for the UE as the center of the receiving beam direction range, then selects m−1 receiving beam directions to detect subsequences in a preamble sequence on both sides of the center, and then repeats the above operations of sweeping and detecting at the following consecutive n−1 random access transmission occasions, so as to determine the optimal receiving beam direction of the base station and the optimal transmitting beam direction of the UE.

Step 307, the base station transmits Random Access Response (RAR) to the UE.

If successfully detecting the preamble sequence, the base station determines the conventional parameter information shall be contained in the contention-free random access response such as the TA parameter, Cell-Radio Network Temporary Identifier (C-RNTI) of the UE, data transmission resource allocation, the current preamble sequence, the base station optimal receiving beam direction and the UE optimal transmitting beam direction, and so on, and then transmits these information to the UE by RAR. Wherein, the UE optimal transmitting beam direction can be indicated by the detected random access transmission occasion index.

Step 308, the UE receives the RAR transmitted by the base station, determines the random access and waits for scheduling.

After transmitting the random access request, the UE detects the RAR at dedicated time-frequency resources according to pre-agreed timing or according to indication of the base station. If the detection is succeed, then transmits ACK, adjusts TA and transmitting beam direction, and waits for the further scheduling for the base station; if the detection is failed, then transmits NACK until reaching the maximum waiting time. When the waiting time exceeds the maximum waiting time, the UE restarts to perform random access.

Embodiment 2

Please refer to FIG. 7, taking the random access scenario of the UE for cell handover as an example, so as to explain how to complete the whole process of random access by the method for random access configuration according to the implementation cooperated with the method for random access request according to the implementation. It is assumed that UE is serviced for base station A in the cell handover scenario of this embodiment, the UE moves from cells of base station A to cells of base station B, thus resulting random access of handover across cells.

Step 401, base station A receives periodical report measurement result from the UE, and determines whether the UE needs to perform cell handover according to the measurement result.

Step 402, base station A determines the UE needs to perform cell handover, and transmits handover request to base station B.

Based on the measurement result, if base station A determines that the UE needs to hand over to base station B, and requests base station B to serve base station A, then base station A transmits the handover request to base station B. The handover request contains UE context information, information about the maximum number of transmitting beam direction of the UE, and current matching beam pair information between the UE and base station A. Wherein, the matching beam pair information can be represented by the optimal receiving beam direction and the optimal transmitting beam direction current deployed by base station A for the UE.

Step 403, base station B receives handover request from base station A, and determines the random access configuration information.

Related information of the random access configuration information and the random access channel structure is almost the same as the description in step 303 of Embodiment 1, and the difference lies in the step of the determination of the repetition times of subsequences in a preamble sequence m and the number of random access transmission occasion n.

In this embodiment, base station B determines the number of random access transmission occasion n according to the maximum transmitting beam direction number of the UE carried in the handover request, so as to reduce necessary increased communication interaction overhead due to the condition that the undetermined position and orientation of the UE in the handover scenario and the condition that the UE transmitting beam direction range is hard to being determined according to the beamforming gain.

For the determination of the repetition times of subsequences in a preamble sequence m, one implementation is that, base station B calculates and determines base station receiving beam direction range in real time according to geographic relation with base station A, matching beam pair information between base station A and the UE carried in the handover request, cell radius of the base station, so as to further determine repetition times of the subsequences in a preamble sequence m.

Please refer FIG. 8, geographic relation between base station B and base station A can be pre-stored in base station B, which can also be replaced by a reference direction between base station A and base station B. In other words, the reference direction between base station A and base station B is the beam matching pair direction with highest beamforming gain between the two base stations. Base station B can position that the UE is on a ray where the optimal receiving beam direction/the optimal transmitting beam direction current deployed by base station A for the UE, according to the reference direction with the base station A and the matching beam pair information between the base station A and the UE. Specifically, for further positioning the more accurate position of the UE, the possible position of the UE can be limited within a certain range by using cell radius of the base station. For example, it is decided that the UE is located within a range with a length of $^PR$ of edge of the cell belongs to base station A. Wherein, $^P$ is a scale factor, $0<p\leq 1$, R is the radius of the cell belonging to base station A. Since the UE requiring handover is normally at the edge of the cell, the accuracy of the positioning and the probability of successful position can be increased by positioning the UE by using the radius of the cell. Accordingly, base station B can determine the base station receiving beam direction range.

In other implementation, a correspondence table between the optimal receiving beam direction/the optimal transmitting beam direction current deployed by base station A for the UE and the base station receiving beam direction range can be made, the table can be made while the cell is arranged, the instance of table is shown in table 2. In table 2, one beam of base station A corresponds to one base station receiving beam direction range of base station B. Base station A transmits a beam index to base station B. Base station B inquires table 2 to determine the corresponding base station receiving beam direction range, so as to further determine the repetition times of subsequences in a preamble sequence m. Besides, the base station receiving beam direction range can also be determined by base station A inquiring table 2, then base station A transmits the base station receiving beam direction range to base station B by handover request.

TABLE 2

| the correspondence between the beam of base station A and base station B receiving beam direction range | |
|---|---|
| Base station A beam index (using reference direction as center) | Base station B receiving beam direction range |
| Beam 1 | Sweeping range 1 |
| Beam 2 | Sweeping range 2 |
| Beam 3 | Sweeping range 3 |

Please refer FIG. 9, for reducing overhead of the informing signaling, and avoiding possible confusion, the beam index of base station A and base station B receiving beam direction range both can perform ordering and indexing using corresponding reference beam as baseline. In FIG. 9, using the beam in reference direction as baseline, the index of the beam in reference direction is 0, performs ordering and indexing on other beams in an anticlockwise direction. The selected base station B receiving beam direction range is the beam range of index 2 to index 4.

Step 404, base station B transmits the random access configuration information to base station A by handover request response, and indicates base station A to transmit the random access configuration information to the UE by handover command.

Step 405, the UE receives random access configuration information transmitted by base station A, and transmits random access request containing preamble sequence to base station B.

Step 406, base station B detects the preamble sequence, and receives the random access request from the UE.

Step 407, base station B transmits the random access response to the UE.

Step 408, the UE receives the random access response transmitted by base station B, determines random access, and waits for scheduling.

The contents of steps 405-408 is basically the same as the contents of steps 305-308 in Embodiment 1, and will not be repeated here.

It is to be noted that, Embodiment 1 and Embodiment 2 provide the whole process that the UE establishes optimal beam pair matching (i.e. the UE optimal transmitting beam direction and the base station optimal receiving beam direction) of uplink with the base station, and then the condition that the UE establishes optimal beam pair matching (i.e. the base station optimal transmitting beam direction and the UE optimal receiving beam direction) of downlink with the base station is indicated below. In scenario of Embodiment 1, the UE performs downlink measurement on the base station for obtaining the base station optimal transmitting beam direction, and transmits the base station optimal transmitting beam direction to the base station by measurement report. In scenario of Embodiment 2, the UE performs downlink measurement on base station B for obtaining the base station optimal transmitting beam direction, and transmits the base station optimal transmitting beam direction to base station A by measurement report, and then base station A transmits the base station optimal transmitting beam direction to base station B by handover request.

Embodiment 3

In the above two embodiments, those two both assume there is no beam reciprocity between the base station and the UE, in other words, the optimal transmitting beam direction of the base station is different from the optimal receiving beam direction of the base station, and the optimal transmitting beam direction of the UE is different from the optimal receiving beam direction of the UE. In this condition, the base station and the UE need to respectively determine their respective optimal transmitting beam direction and optimal receiving beam direction. If there is beam reciprocity of the channel, in other words, the optimal transmitting beam direction of the base station is parallel to the optimal receiving beam direction of the base station, and the optimal transmitting beam direction of the UE is parallel to the optimal receiving beam direction of the UE, thereby the random access of this implementation is greatly simplified. This embodiment will make further explanation about process of the random access configuration of the base station and random access request of the UE in this implementation while there is beam reciprocity.

In the scenario that there is beam reciprocity, the UE determines the UE optimal receiving beam direction (the UE simultaneously obtains the UE optimal transmitting beam direction according to the beam reciprocity) and the base station optimal transmitting beam direction by measurement. The UE transmits the base station optimal transmitting beam direction to the base station by uplink control channel or uplink shared channel or a way of measurement report. The base station obtains the base station optimal transmitting beam direction, in other words, the base station can obtains the base station optimal transmitting beam direction according to the beam reciprocity.

Specifically, taking the contention-free random access of the single base station in Embodiment 1 as an example, the UE first performs measurement report, and then transmits the base station optimal transmitting beam direction to the base station by measurement result. If the base station decides to indicate the UE to trigger random access, then the base station determines random access configuration information, and transmits the random access configuration information to the UE. Wherein the repetition times of subsequences in a preamble sequence m and number of random access transmission occasion n allocated in the random access configuration information are both 1. The UE transmits random access request in the UE optimal transmitting beam direction to the base station according to the dedicated way of the random access configuration information. The base station detects and receives the preamble sequence transmitted by the UE using the base station optimal receiving beam direction, and transmits RAR to the UE.

It is to be noted that, if the base station needs to adjust the receiving beam direction on base station side, the base station can allocate the repetition times of subsequences in a preamble sequence m as a corresponding value which is not equal to 1 in the random access configuration information; if the base station needs to adjust transmitting beam direction on the user side, then the base station can allocate the number of random access transmission occasion n as a corresponding value which is not equal to 1 in the random access configuration information. At this time, the process that the UE triggers random access request and the process that the base station receives preamble sequence are the same as Embodiment 1.

Embodiment 4

In Embodiment 2, a mode for applying the method provided according to the present invention to a cell handover process is described. However, the measurement result that the terminal only feed backs an individual downlink transmitting beam from a target base station (or its corresponding synchronization signal block (SSB)) is described in Embodiment 2. A source base station transmits the measurement result for the target base station which is fed back by the terminal to the target base station via a handover request. The target base station selects and configures random access channel time-frequency resource and random access preamble sequence for contention-free random access according to the measurement result.

In other scenarios, the terminal measures the reference signal received powers of a multiple of downlink transmitting beams (or the corresponding synchronization signal blocks), and feeds back a multiple of measurement results which satisfy a predetermined requirement, i.e. feeds back measurement results of a multiple of SSBs. In this scenario, the source base station transmits the measurement results of a multiple of SSBs which are measured and reported by the terminal to the target base station in a handover request. Aiming to measurements of the multiple of SSBs, the target base station allocates a multiple of random access channel time-frequency resource groups for transmitting a preamble sequence, and establishes a correspondence between the random access channel time-frequency resource groups and the SSBs (or downlink transmitting beams corresponding to the SSBs). This correspondence is transmitted to the source base station via a handover request feedback. The source base station informs the terminal of the random access channel time-frequency resource information allocated by the target base station and the correspondence between the SSBs and the random access channel time-frequency resource groups via the random access configuration information. The correspondence between the SSBs (or corresponding downlink transmitting beams) and the random access channel time-frequency resource groups is described in FIG. 10.

It is to be noted that, the resources is allocated among the random access channel time-frequency resource groups corresponding to the different SSBs shown in FIG. 10 in a manner of frequency-division multiplexing. In actual system, the resources may also be allocated in a manner of time-division, i.e. the random access channel time-frequency resource groups corresponding to the different SSBs occupy the different time resources and are not overlapping each other; or the resources may be allocated in a manner of code-division, i.e. the different random access channel time-frequency resource groups occupy the same time-frequency resource. However, during a random access, the used preamble sequence is from a different preamble sequence resource pool; or the time-frequency resource and the preamble sequence resource are allocated in combination of the above manners.

Furthermore, a same random access time-frequency resource group contains one or more random access sub-channels for transmission of the random access preamble sequence. The number of the random access sub-channels contained in each random access channel time-frequency group is transmitted in the random access configuration information. One possible mode is: each random access channel time-frequency resource group contains same number of random access sub-channels, in which case, it is only required to inform the number of random access sub-channels contained in each random access channel time-frequency resource group at this time. In the other possible mode, the numbers of random access sub-channels contained in different random access channel time-frequency resource groups are different. In this case, it is necessary to inform the number of the random access sub-channels contained in each random access channel time-frequency resource group. One possible informing mode is informing and configuring in a form of series or vector. For example, a possible configured series or vector is $[M_1, M_2, \ldots M_N]$. This series indicates that, there are N random access channel time-frequency resource groups, wherein the $i^{th}$ random access channel time-frequency resource group contains random access sub-channels. In other possible mode, the numbers of random access sub-channels contained in each random access channel time-frequency resource group are informed together with time-frequency resource configuration of the random access channel time-frequency resource group.

A multiple of random access channel time-frequency resource groups can be configured such that, time-frequency resource information of different random access channel time-frequency resource groups are configured independently. Time-frequency resource information of each random access channel time-frequency resource group contains time-frequency resource information of each random access sub-channel. It is also possible to contain the time-frequency resource information of the first random access sub-channel and optionally a relation between the adjacent sub-channels. For example, A possible relation between the adjacent sub-channels can be represented as number of the time units (subframe/time slot/mini-time slot) of the interval between adjacent sub-channels, or number of physical resource blocks of interval. In this way, it is necessary for the time-frequency resource information of random access sub-channel to contain the number of sub-channels which is used for a terminal to determine the time-frequency resource position of each sub-channel, if number of sub-channels contained in the each random access channel time-frequency resource group is not informed independently.

A multiple of random access channel time-frequency resource groups can also be configured such that, only the time-frequency resource information of all random access sub-channels, or the time-frequency resource information of the first sub-channel and interval information between adjacent sub-channels are informed. Meanwhile, the sub-channels are ordered or indexed in a predetermined manner (i.e. ordering and indexing in a time priority or frequency priority), and the number of the sub-channels contained in each random access channel time-frequency resource group is informed. The allocation mode can be described by FIG. 11.

The configuration information of random access channel time-frequency resource group further contains a correspondence between the random access channel time-frequency resource groups and downlink synchronization blocks. A simple informing and configuring mode can be carrying corresponding SSB index in the random access channel time-frequency resource group. Another informing and configuring mode can be informing in a form of vector or sequence, wherein, the element in the vector or sequence is index of the SSB. For example, the index sequence of the SSB containing N random access channel time-frequency resource groups is $[I_1, \ldots, I_N]$, wherein, $I_1$ is the index of SSB corresponding to the $i^{th}$ random access channel time-frequency resource group.

After receiving the random access configuration information, the terminal selects the SSB according to the measurement result and the predetermined criterion. The terminal selects the corresponding random access channel time-frequency resource group and transmits the corresponding preamble sequence on the basis of the correspondence between the SSB and the random access channel time-frequency resource group. Wherein, the predetermined criterion can be selecting SSB with the maximum measured reference signal received power.

The base station detects the preamble sequence. If the preamble sequence is detected, the base station determines, according to the random access channel time-frequency resource group where the corresponding random access channel time-frequency resource is located, the downlink transmitting beam corresponding to the SSB which is favored by the terminal. The downlink transmitting beam is used to transmit a Random Access Response (RAR).

Please refer FIG. 10, the base station apparatus for random access configuration in this implementation comprises:

a configuration information determination module, configured to determine random access configuration information, the random access configuration information comprises repetition times of subsequences in a preamble sequence m and number of random access transmission occasion n, wherein, m and n both are positive integers which are no less than 1;

a configuration information transmitting module, configured to transmit the random access configuration information to a user equipment (UE) so as to indicate the UE to transmit subsequences in a preamble sequence at n random access transmission occasions, wherein transmitting m repeated subsequences in a preamble sequence at each random access transmission occasion;

a preamble sequence detection module, configured to detect the subsequences in a preamble sequence transmitted by the UE by sweeping at each random access transmission occasion, determining the optimal random access transmission occasion according to the detection result;

an access response feedback module, configured to transmit the optimal random access transmission occasion information to the UE by using Random Access Response (RAR).

The operation processes of the configuration information determination module, configuration information transmission module, preamble sequence detection module and access response feedback module respectively corresponds to steps 101, 102, 103 and 104 of the method for random access configuration in this implementation, and will not be repeated here.

Please refer to FIG. 11, the user equipment (UE) for random access request in this implementation comprises:

a configuration information receiving module, configured to receive random access configuration information transmitted by a base station, the random access configuration information comprises repetition times of subsequences in a preamble sequence m and number of random access transmission occasion n, wherein, m and n both are positive integers which are no less than 1;

a preamble sequence transmitting module, configured to the transmit subsequences in a preamble sequence at n random access transmission occasions, wherein transmitting m repeated subsequences in a preamble sequence at each random access transmission occasion;

an access response receiving module, configured to receive optimal random access transmission occasion information transmitted by the base station by using Random Access Response (RAR), and wherein, the optimal random access transmission occasion is determined according to the detection result after the base station detects the subsequences in a preamble sequence at each random access occasion by sweeping.

The operation processes of the configuration information receiving module, the preamble sequence transmitting module and the access response receiving module respectively corresponds to steps 201, 202 and 203 of the method for random access request in this implementation, and will not be repeated here.

Embodiment 5

In this embodiment, the UE is in an RRC connected state, and the base station triggers the contention-free random access process. The possible triggering reasons comprises: (1) while downlink data reaches, the UE uplink is out of step (for example, out of step caused by the fact that current beam matching pair is no longer the optimal beam matching pair due to the movement of the UE or a time-varying characteristic of the radio channel, or caused by the inaccuracy of the current used timing advance, or the like), meanwhile, the UE needs to feed back the received ACK/NACK information of the downlink data via the uplink channel; (2) the downlink beam response process triggered by the base station, or the like. In these scenarios, while in an RRC connected state, the UE can receive a higher-layer signaling (including system information). The base station triggers the contention-free random access process by Physical Downlink Control Channel (PDCCH).

Step 501, the base station determines the random access resource configuration information according to the beam direction prior information.

Step 502, the base station transmits the random access resource configuration information via the downlink control information and/or higher-layer signaling (including system information), so as to trigger the contention-free random access process.

Step 503, the UE receives PDCCH. If downlink control information (DCI) of a predetermined format is detected in the PDCCH, and the Cyclic Redundancy Check (CRC) of the DCI of this format is scrambled by UE identifier of the UE (for example, C-RNTI), the downlink data is read according to a resource scheduling indication in this DCI, and this DCI is regarded as the DCI used for triggering the contention-free random access process.

Step 504, the UE reads the DCI so as to acquire the random access resource configuration information, and selects corresponding random access channel time-frequency resource and the random access preamble sequence according to the last measurement result for the downlink signal (for example, the synchronization signal).

For distinguishing the contention-free random access from the contention-based random access, the random access can be configured in the following manner. The time-frequency resource for contention-free random access and the time-frequency resource for contention-based random access can be distinguished in a form of frequency division, or by using non-overlapping time-frequency resource. Meanwhile, for utilizing the prior information of the beam matching pair, contention-free random access process can use the preamble sequence format and the random access channel configuration different from those of the contention-based random access process. In this case, for the contention-free random access process triggered by the reaching of the downlink data, the following contents is required to be included in the DCI.

a downlink resource allocation indication a physical random access channel configuration index a preamble index a physical random access channel index a number of other possible configuration information.

Wherein, the downlink resource allocation indication is used for indicating the allocation of the downlink physical resources. In a possible form, the indication manner in LTE is used, and a related indication comprises a centralized/discrete virtual resource block allocation indication which is set as "0" and a downlink resource block allocation indication. In another possible form, only the downlink resource block allocation indication is included.

Furthermore, zero padding is performed on the part having length shortage if a length of a DCI cannot satisfy the length of a DCI format. The CRC of this DCI is scrambled by using the C-RNTI of the UE which needs to initiate the contention-free random access.

Wherein, the centralized/discrete virtual resource block allocation indication and the downlink resource block allocation indication is used to inform the UE of the time-frequency resource position where the downlink data of the UE is located, i.e. scheduling information of the PDSCH;

and physical random access channel configuration index, the preamble sequence and physical random access channel index are used for configuring the contention-free random access process.

It is to be noted that, the physical random access channel configuration information from the system information contains the random access preamble sequence format information, therefore, the UE can be indicated again to use the preamble sequence format which is different from the contention-based random access process by reconfiguring the physical random access channel configuration information in DCI. Since the preamble sequence format contains the repetition times of the preamble sequence, the sweeping times of the base station receiving beam can be adjusted by adjusting the repetition times. Specifically, it is impossible for the base station without beam reciprocity to determine receiving beam direction through the transmitting beam direction. Therefore, while detecting the preamble sequence, it is necessary to determine the optimal receiving beam direction by sweeping the receiving beams. Therefore, while configuring the preamble sequence format, it is necessary to configure the preamble sequence format with higher repetition times. However, for a contention-free random access process triggered by PDCCH when being a connected state, the base station side also has certain prior information of the receiving beam direction even in a condition that inaccurate beam matching pair occurs. Therefore, the sweeping times of receiving beam on the base station side is reduced, and delay of the access is decreased by configuring a preamble sequence format with less repetition times. The above processes are shown in FIG. 12 and FIG. 13.

Referring to FIG. 12 and FIG. 13, FIG. 12 shows the preamble sequence format used while the UE performs the contention-based random access process in an idle state. Since there is no beam reciprocity on the base station side, a multiple of sweeping of the receiving beam is required so as to determine the optimal receiving beam direction. Therefore, it is necessary to configure a preamble sequence format with more repetition times. FIG. 13 shows the preamble sequence format used while the UE performs the contention-free random access process in a connected state. Since there is no contention and meanwhile the base station side has certain prior information of receiving beam direction, the preamble sequence format with less repetition times can be used. The base station determines the beam sweeping range according to the prior beam direction during the detection, and performs the receiving beam sweeping.

The above provides a case of determining the receiving beam direction on the base station side in the disclosed contention-free random access method. The following provides a case of transmitting the beam direction on the UE side. For the UE, it is only allowed the UE to use one uplink transmitting beam to transmit a preamble sequence before receiving an RAR. However, for the UE without beam reciprocity, if the beam matching pair of the selected uplink transmitting beam is not correct, the UE requires a multiple of random access attempts to determine the optimal transmitting beam direction, so as to increase the access delay. Therefore, for the UE without beam reciprocity, it is allowed the UE to use a multiple of transmitting beam to perform transmission of the random access preamble sequence before receiving the RAR, that is, a multiple of random access channel time-frequency resources are allocated so as to enable the UE to perform the transmission of the random access preamble sequence using a multiple of transmitting beams.

When the UE transmit a preamble sequence before receiving the RAR by only using one uplink transmitting beam, if the original random access channel configuration information contains the random access channel time-frequency information, the UE selects, according to original random access channel configuration information and the physical random access channel index, corresponding time-frequency resource from the available random access channel time-frequency resource to transmit the preamble sequence; if it is impossible to directly determine the random access channel time-frequency resource on the basis of the original random access channel configuration information, it is necessary to add the following contents for determining the random access channel time-frequency resource into the DCI.

random access channel time-frequency resource information when the UE transmits the random access preamble sequence by using a multiple transmitting beams before detecting the RAR, it is necessary to determine number of configured random access channel which can be used for transmitting the preamble sequence and the corresponding time-frequency resource. The configuration can be performed in the following manner.

(1) The random access channel configuration information dedicated for the contention-free random access process is preset. The base station informs the UE of the dedicated random access channel configuration information via higher-layer signaling (including system information). The dedicated random access channel configuration information contains information such as a preamble sequence format, random access channel time-frequency resource information and number of random access channel contained in a random access channel group. Wherein, the random access channel time-frequency resource information and information about number of random access channel contained in the random access channel group are used for determining the random access channel structure of the contention-free random access process, as shown in FIG. 14.

Referring to FIG. 14, a random access channel group consists of a multiple of random access channels. Each random access channel can use uplink transmitting beam to transmit a preamble sequence. Two adjacent random access channels can be continuous in time, and can also have an interval of several time units (for example, symbol, timeslot, mini-slot and subframe, etc.). Structure of each random access channel is the same as structure of random access channel configured independently, which is used for transmitting the preamble sequence of the random access preamble sequence format indicated by the random access channel configuration. Besides the above information, the random access channel configuration information also comprises indication information such as cycle/density in time domain or number of random access in frequency domain of the random access channel group which can be used for the UE to determinate a position of a random access channel group while performing access or performing access attempt again. The cycle/density of the random access group in time domain and allocated number of the random access channel groups in frequency domain can be transmitted in the DCI, or can be configured in higher-layer signaling.

(2) The random access channel group time-frequency resource for contention-free random access process is directly indicated to the UE by the base station in real time. The base station informs the UE of the random access channel group time-frequency resource for contention-free random access process via the DCI. For indicating the random access channel group time-frequency resource for contention-free random access process, the indicated contents shall contain:
- time-frequency resource position indication of the random access channel group
- number of random access channel contained in the random access channel group
- cycle/density of the random access channel group in time domain
- number of random access channel group in frequency domain
- a preamble sequence format used in the random access process.

wherein, a time-frequency resource position indication of a random access channel group can be identified by the time-frequency resource position of the first random access channel in the random access channel group. The UE determines the time-frequency resource position of the random access channel in the random access channel group according to the other contents in the preset information. If the random access channels in the random access channel group are not distributed continuously, one configuring mode is that the random access channels in the random access channel group are determined in a preset manner at an interval in time domain, the other configuring mode is that indication information for time interval among adjacent random access channels is added.

(3) Combination of the two modes, that is, the random access channel configuration information is preset, which contains information such as a random access preamble sequence format, number of random access channels contained in the random access channel group, time-frequency information of random access channel group, cycle/density of the random access channel group in time domain, and number of random access channel groups in frequency domain. Meanwhile, other specific time-frequency resource information of random access channel group is transmitted in DCI in real time, for example, indication information of contention-free random access channel time-frequency resource indication. The random access channel for contention-free random access process and random access channel for contention-based random access process is multiplexed in a manner of frequency-division. The DCI comprises an actual frequency-domain position (represented by a physical resource block index) of random access channel group for contention-free random access or an offset relative to the frequency-domain position indication in the random access channel configuration information, as shown in FIG. 15.

Besides the above contents, the DCI for triggering a contention-free random access process can also contain correspondence between the downlink signal and the random access resource for the contention-free random access process. In this embodiment, it is assumed that there is a correspondence between SSBs and random access channel groups. The UE selects the random access resource corresponding to the SSB with the best measurement result by the measurement of the SSB such as a reference signal received power of Secondary Synchronization Signal (SSS) in the SSB or a reference signal received power of a demodulation reference signal in the SSB.

For a multi-beam operation system, it is necessary to indicate the optimal downlink transmitting beam of the base station by the time-frequency position of the random access channel group or the preamble sequence used by the random access, so as to transmit an RAR. That is, a multiple of random access resource (comprising a multiple of random access channel groups and/or a multiple of preamble sequences) are allocated. The UE determines the selected random access resource according to the downlink measurement result. A possible mode for allocating and indicating the resource is that: the rough downlink transmitting beam direction on the base station side is determined according to the exist prior information on the base station side, for example, the range of the downlink transmitting beam is determined using the previous successful downlink transmitting beam as a baseline; the random access resource of corresponding amount is allocated according to the determined number of downlink transmitting beams, and a correspondence between the downlink signal transmitted by the downlink transmitting beam (for example SSB or the like) and the corresponding random access resource is set and is informed to the UE via DCI.

The above described random access resource comprises available random access channel groups and available random access preamble sequences. An indicating mode of the correspondence is that: the DCI transmitted in the downlink control channel comprises a multiple of allocated random access channel configuration information, the each random access resource configuration information comprises corresponding random access channel configuration information, necessary information for configuring random access channel time-frequency resource, random access preamble index and downlink synchronization signal index corresponding to the random access resource. The above structure is shown in FIG. 16. In FIG. 16, the downlink synchronization signal index can be a downlink transmitting beam index or an SSB index.

As a special case of the above manner of allocating and indicating, the base station only allocates one group of random access channel configuration information, and distinguishes different uplink signals and corresponding downlink beams according to different random access preamble indexes. At this time, the structure of DCI can be simplified such that, the DCI comprises random access channel configuration information, corresponding time-frequency resource indication information, preamble index corresponding to a multiple of downlink synchronization signals and corresponding downlink synchronization signal index, the specific structure is shown in FIG. 17.

As another special case of the above manner of allocating and indicating, the base station allocates a multiple of random access channel configuration information, each random access channel configuration information corresponds to different downlink synchronization signal, and each random access channel configuration information corresponds to same random access preamble index. Different downlink signals and corresponding downlink beams are distinguished according to different random access channel time-frequency resources. At this time, the structure of DCI can be simplified such that, the DCI comprises random access preamble index, a multiple of random access channel configuration information, corresponding time-frequency resource indication information and downlink signal index, the specific structure is shown in FIG. 18.

In addition, the indication mode of the correspondence can be a configuration mode using a group as a unit. For example, the DCI contains a multiple of random access resource configuration information. Each random access resource configuration information contains one random access channel configuration information and its corresponding time-frequency resource indication information, and several corresponding preamble indexes and downlink synchronization signal indexes used for being transmitted in this time-frequency resource, the specific structure is shown in FIG. 19.

It is to be noted that, in the description of the embodiment as so far, it is assumed that the downlink signal refers to the SSB, that is, the SSS in the SSB or the demodulation reference signal in the broadcast channel of the SSB. In other implementation of the disclosure, the random access channel time-frequency resource for the contention-free random access may have a correspondence with other downlink signals for beam measurement or channel measurement. For example, a correspondence between CSI-RS and the contention-free random access channel time-frequency resource is established. The UE uses the CSI-RS carried in the downlink transmitting beam for measuring the channel state information. The UE determines the random access channel time-frequency resource for transmitting a preamble sequence according to the measurement result and the correspondence between the CSI-RS and the random access channel time-frequency resource, if the base station allocates a multiple of random access channel time-frequency resource for the contention-free random access. Specifically, both of the configuring and informing modes of the random access channel time-frequency resource for the contention-free random access process in the above embodiment both can be employed. However, the SSB index in the random access time-frequency resource shall be replaced with the time-domain resource index of CSI-RS, and the configuring and indicating mode are not be influenced.

Step 505, the UE transmits a preamble sequence in the selected random access channel time-frequency resource.

Embodiment 6

In this embodiment, the contention-free random access process and contention-based random access process use a same random access channel time-frequency resource, and the contention-free random access process and the contention-based random access process are distinguished from each other through the dedicated random access preamble sequence allocated by the base station. Meanwhile, it is assumed that a same random access preamble sequence format is used within a cell.

Step 601, the base station determines random access resource configuration information according to the beam direction prior information.

Step 602, the base station transmits the random access resource configuration information via the downlink control information and/or higher-layer signaling (comprises system information) so as to trigger the contention-free random access process.

Step 603, the UE receives the downlink control channel. If the UE detects that the format of DCI in the downlink control channel uses the UE identifier of the UE (for example, C-RNTI) to scramble the CRC, it is considered that this DCI triggers the contention-free random access process.

Step 604, the UE reads the DCI so as to acquire the random access resource configuration information therein, and the UE selects the random access channel time-frequency resource and the preamble sequence according to the last measurement on the SSB and the correspondence between the SSB and the random access resource (comprising the random access channel time-frequency resource and the preamble sequence); or directly uses the allocated random access channel time-frequency resource and the preamble sequence.

Referring to FIG. 20, in this embodiment, a random access channel time-frequency resource set consists of a multiple of random access channel time-frequency resources for transmitting a preamble sequence, and each random access channel time-frequency resource corresponds to one or more downlink SSBs (or downlink signals). FIG. 20 shows that there is a one-to-one correspondence between an SSB and a random access channel time-frequency resource in a random access channel time-frequency resource set. However, a correspondence between a multiple of SSBs and one random access channel time-frequency resource is also possible in this embodiment. Furthermore, FIG. 20 only shows a condition that the random access channel time-frequency resource set and the random access channel time-frequency resource are distributed in time domain. However, the embodiment also comprises a condition that they are distributed in frequency domain.

(1) An one-to-one correspondence between the random access channel time-frequency resource and the downlink SSB When the DCI is for triggering the contention-free random access process, the CRC of the DCI is scrambled using the UE identifier. Wherein, the UE identifier can be a C-RNTI of the UE. The contents of the DCI comprise:
a downlink resource indication
a preamble index
a physical random access channel index
a physical random access channel time-frequency resource index
other possible configuration information.

Wherein, the above downlink resource allocation indication is used for indicating allocation of the downlink physical resources. In a possible mode, an indication mode in LET is used, and the related indication comprises a centralized/discrete virtual resources block allocation indication which is set as "0" and a downlink resource block allocation indication. In another possible mode, only the downlink resource block allocation indication is comprised.

Furthermore, if a length of a DCI cannot satisfy the length of DCI format, zero padding is performed on the part having length shortage. The CRC of this DCI is scrambled by using the C-RNTI of the UE which needs to initiate the contention-free random access.

Wherein, the centralized/discrete virtual resource block allocation and the downlink resource block allocation indication are used to inform the UE of the time-frequency resource position where the downlink data of the UE is located, i.e. scheduling information of the PDSCH; the preamble index, the physical random access channel index, and physical random access channel time-frequency resource index are used for configuring the contention-free random access process. The preamble index is used for configuring a dedicated preamble sequence for the contention-free random access; the physical random access channel index is used to select a random access channel time-frequency resource set from a multiple of random access channel time-frequency resource sets available in time domain or frequency domain; the physical random access channel time-frequency resource index is used to select one or more random access channel time-frequency resources from the random access channel time-frequency resource set for transmitting a preamble sequence.

Specifically, if the base station can determine the optimal downlink transmitting beam for the UE, what is required is to only indicate the unique physical random access channel time-frequency resource index in the DCI, that is, to provide the unique random access channel time-frequency resource index for indicating the UE the used random access channel time-frequency resource in the random access channel time-frequency resource set.

If the base station cannot determine the unique optimal downlink transmitting beam, the base station can only determine the range of the downlink transmitting beams. In this condition, the physical random access channel time-frequency resource indication cannot indicate single individual index only, but need to indicate the physical random access channel time-frequency resource index range, which can use the following mode:

a. performing segmentation on all physical random access channel time-frequency resources according to a certain granularity, and informing in a form of an index of a look-up table. Taking an example of the maximum number of random access channel time-frequency resources is 64, a form of the look-up table is shown as Table 3.

TABLE 3 example of look-up table

| Index | Range of resource index |
|-------|-------------------------|
| 0     | 0~7                     |
| 1     | 4~11                    |
| 2     | 8~15                    |
| 3     | 12~19                   |
| 4     | 16~23                   |
| 5     | 20~27                   |
| 6     | 24~31                   |
| 7     | 28~35                   |
| 8     | 32~39                   |
| 9     | 36~43                   |
| 10    | 40~47                   |
| 11    | 44~51                   |
| 12    | 48~55                   |
| 13    | 52~59                   |
| 14    | 56~63                   |

In table 3, eight adjacent physical random access channel time-frequency resources are classified into a group, and the adjacent groups overlap. Meanwhile, number of bits required by the index is 4. Furthermore, an option in which all the physical random access time-frequency resources are optional can be added.

b. a structure of the physical random access channel time-frequency resource indication is shown in FIG. 21. That is, the physical random access channel time-frequency resource indication comprises: indication for indicating number of channel time-frequency resources of fixed number of bits; indication for indicating physical random access channel time-frequency resource index of variable number of bits.

c. an index of allocated physical random access channel time-frequency resource is informed in a form of a bit map. Specifically, the physical random access channel time-frequency resource index is informed by the vector consisting of 0 and 1, wherein each possible physical random access time-frequency resource corresponds to one bit in this vector. If this bit is 0, it is indicated that the physical random access channel time-frequency resource of this position is unavailable; if this bit is 1, it is indicated that the base station allocates the physical random access channel time-frequency resource corresponding to this position for the contention-free random access process.

(2) An one-to-many correspondence between the random access channel time-frequency resource and the downlink SSB.

The base station determines the available downlink transmitting beam according to the physical random access channel time-frequency resource and the preamble sequence used by the UE. If the base station can determine the unique downlink transmitting beam, that is, can determine the unique physical random access channel time-frequency resource, the above structure can be re-used.

If the base station cannot determine the unique downlink transmitting beam direction, then only one range can be determined, a multiple of time-frequency resource index indications and a multiple of preamble index indications are required. Wherein, the physical random access channel time-frequency resource indication can be indicated and informed in the above modes. If it is necessary to allocate a multiple of preamble sequences so as to distinguish different downlink transmitting beams by using the preamble sequences, number of random access preamble sequences can be added in the DCI which triggers the contention-free random access process. In this condition, the contents of DCI are shown in the following:

a downlink resource indication
number of a preamble sequences
a preamble index
a physical random access channel index
a physical random access channel time-frequency resource index
other possible configuration information.

Wherein, the above downlink resource allocation indication is used for indicating allocation of the downlink physical resources. In a possible mode, an indication mode in LET is used, and the related indication comprises a centralized/discrete virtual resources block allocation indication which is set as "0" and a downlink resource block allocation indication. In another possible mode, only the downlink resource block allocation indication is comprised.

Furthermore, it is to be noted that, the correspondence between the preamble sequence and the SSB can be informed in an implicit manner. For example, the system information indicates number of SSBs which are mapped to the same random access channel time-frequency resource, and a mapping relation between the preamble sequence and the SSB is established according to the order of the allocated preamble indexes. Furthermore, the correspondence between the preamble sequence and the SSB can also be informed in an explicit manner, for example, adding SSB index vector into the downlink SSB, wherein, number of the elements and the number of the allocated preamble sequences are consistent, which are used for indicating the SSB corresponding to the respective preamble sequence.

Step 605, the UE transmits the preamble sequence on the random access channel time-frequency resource.

Embodiment 7

As to the contention-free random access process, in particular the contention-free random access process triggered by the event that the downlink data reach, the base station has certain prior information for the channel state information of the UE. Therefore, a certain adjustments can be made for the power control of the preamble sequence so as to reduce number of attempts for random access process.

Step 701, the base station determines random access resource configuration information according to prior information of the beam direction.

Step 702, the base station transmits the random access resource configuration information via downlink control information and/or higher-layer signaling so as to trigger the contention-free random access process.

Step 703, the UE receives a DCI. If the UE finds that a CRC of a DCI format is scrambled with the UE identifier, it is considered that this DCI triggers the contention-free random access process.

Step 704, the UE reads the random access configuration information in the DCI, which comprises random access channel time-frequency resource, an allocated preamble sequence and power control information. The UE calculates the transmitting power of the preamble sequence according to power control information carried in the DCI and in the received higher-layer signaling (comprising system information).

In this embodiment, the contention-free random access process is triggered by the downlink control channel, and a power control command is added into the corresponding DCI. At this time, the contents in DCI for triggering the contention-free random access process comprise:

a downlink resource indication
number of preamble sequences
a preamble index
a physical random access channel index
power control command
other possible configuration information.

or, comprises:

a downlink resource indication
number of preamble sequences
a preamble index
a physical random access channel index
a physical random access channel time-frequency resource index
power control command
other possible configuration information.

The above power control command in the DCI is configured in a form of a look-up table, i.e, only the index corresponding to corresponding power control command is transmitted in the DCI. Table 4 is a simple example.

TABLE 4

An example of a table about power control command index

| Index | Power control command (dB) |
|---|---|
| 0 | −3 |
| 1 | 0 |
| 2 | 3 |
| ... | ... |

While configuring the power control command, the base station estimates Channel Quality Information (CQI) or CSI which is reported by the UE at the last time.

The terminal calculates the transmitting power using the following formula:

$$P_{PRACH} = \min[P_{CMAX,c}, \text{PREAMBLE\_RECEIVED\_TARGET\_POWER} + PL_c + \Delta_{TP}] \text{ [dBm]}$$

Wherein, the PREAMBLE_RECEIVED_TARGET_POWER is the preamble sequence transmitting power calculated by a higher layer, taking the power ramping used while reattempting the random access process into account; $PL_c$ is the path loss estimation; $\Delta_{TPC}$ is the power control command; $P_{CMAX,c}$ is the maximum transmission power.

If the base station configures a multiple of available random access channel time-frequency resources, the UE determines the corresponding random access channel time-frequency resource and the preamble sequence, according to the correspondence between the random access channel time-frequency resource (or the preamble sequence) and the downlink signal comprising the SSB or CSI-RS. At this time, the base station can configure same power control command for a multiple of random access channel time-frequency resources, wherein, the format of power control command is the same as above described in this embodiment.

Specifically, in the DCI for triggering the contention-free random access process, a multiple of power control commands are contained, each power control command respectively corresponds to different random access channel time-frequency resource. For example, if N random access channel time-frequency resources are allocated in the DCI, the power control command shall contain the following contents:

Power control command index 0, power control command index 1, . . . , power control command index N-1.

If the UE selects a random access channel time-frequency resource k according to the measurement result and the correspondence, and the corresponding power control command is the $\Delta_{TPC}^{k}$, the UE calculates the preamble sequence transmitting power according to the following formula:

$$P_{PRACH}^{k} = \min\{P_{CMAX,c}, \text{PREAMBLE\_RECEIVED\_TARGET\_POWER} + PL_c^{k} + \Delta_{TPC}^{k}\} \text{ [dBm]}$$

Wherein, the PREAMBLE_RECEIVED_TARGET_POWER is the preamble sequence transmitting power calculated by a higher layer, taking the power ramping used while reattempting the random access process into account; $PL_c^{k}$ is the path loss estimation obtained by measuring the $k^{th}$ SSB by a terminal; $\Delta_{TPC}^{k}$ is the power control command corresponding to the random access channel time-frequency resource k; $P_{CMAX,c}$ is the maximum transmission power.

If the base station configures a unified power control command, the above formula can be simplified as:

$$P_{PRACH}^{k} = \min\{P_{CMAX,c}, \text{PREAMBLE\_RECEIVED\_TARGET\_POWER} + PL_c^{k} + \Delta_{TPC}\} \text{ [dBm]}$$

Step 705, the UE transmits the preamble sequence on a random access channel time-frequency resource using the calculated power.

Embodiment 8

Embodiments 5-7 introduces the contention-free random access process which is triggered by the downlink control channel. The embodiment introduces other application scenarios besides this type of application scenario, such as cell handover, in which, the contention-free random access process is triggered by higher-layer signaling. For a multi-beam transmission system, the corresponding triggering signaling can be optimized in the above manners.

Step 801, the base station determines random access resource configuration information according to prior information of the beam direction.

Step 802, the base station transmits the random access resource configuration information via the downlink control information and/or higher-layer signaling (comprising system information) so as to trigger the contention-free random access process.

Step 803, the UE receives the higher-layer signaling (comprising system information) transmitted on the downlink shared channel, and determines that the contention-free random access process is triggered according to an indication of the higher-layer signaling.

Step 804, the UE reads the dedicated random access configuration information in the higher-layer signaling (comprising system information), that is, a higher-layer parameter RACH-ConfigDedicated, and determines the random access channel time-frequency resource and the preamble sequence for the contention-free random access process according to the random access channel time-frequency resource and the preamble sequence information in the higher-layer parameter RACH-ConfigDedicated.

The contention-free random access process which is triggered by the higher-layer signaling configures the random access channel resource by using the higher-layer parameter RACH-ConfigDedicated. All of the parameters related to the random access resource configuration in Embodiments 5-7 contain this higher-layer parameter for the resource configuration of the random access process.

Specifically, the parameters related to the random access resource configuration comprise a parameter related to random access channel time-frequency resource and a parameter related to random access preamble sequence.

In a simple example, the higher-layer parameter RACH-ConfigDedicated comprises:
RACH-ConfigDedicated=
{
a random access preamble index;
a physical random access channel time-frequency resource group index;
a physical random access channel time-frequency resource index;
}
Wherein, the random access preamble index is used for configuring the random access preamble sequence; the physical random access channel time-frequency resource group index is used for selecting one or more physical random access channel time-frequency resource groups in random access channel time-frequency resource groups available in a certain range of time and frequency; the physical random access channel time-frequency resource index is used for configuring one or more physical random access channel time-frequency resources in a physical random access channel time-frequency resource group so as to transmit a preamble sequence. All configuring manners in Embodiments 5-7 can be used.

Besides, the indication of the correspondence between the downlink signal and the random access resource described in Embodiments 5-7 can also be indicated in a higher-layer parameter RACH-ConfigDedicated in an implicit or explicit form. For example, an explicit indication refers to the case that an index of the configured downlink signal (comprising SSB or CSI-RS) corresponding to the random access channel time-frequency resource is directly carried in the parameter RACH-ConfigDedicated, and an implicit informing refers to the case that the higher-layer parameter RACH-ConfigDedicated only informs the random access channel time-frequency resource index and the UE selects the random access channel time-frequency resource according to a predetermined rule.

Step 805, the UE transmits the preamble sequence on the random access channel time-frequency resource.

Referring to FIG. 22, the disclosed UE comprises:
a random access determination module, configured to determine that a contention-free random access process is triggered;
a time-frequency resource acquisition module, configured to acquire prior information of beam direction and random access resource configuration information, and determine the random access channel time-frequency resource and the preamble sequence according to the prior information of the beam direction and the random access resource configuration information;
a preamble sequence transmitting module, configured to transmit the preamble sequence in the random access channel time-frequency resources.

Referring to FIG. 23, the disclosed base station equipment comprises:
a configuration information determination module, configured to determine random access resource configuration information according to the prior information of the beam direction;
a configuration information transmitting module, configured to transmit the random access resource configuration information via downlink control information and/or higher-layer signaling (comprises system information), so as to trigger the contention-free random access process.

As can be seen in combination with the detailed description of the implementation, compared to the prior art, the implementation comprises at least following beneficial technical effects:

(1) by design of random access channel structure, detection by transmitting a multiple of subsequences in a preamble sequence at a multiple of random access transmission occasions can greatly increase the success rate of the detection and access efficiency.

(2) by combining the beam matching pair of the millimeter-wave communication and the contention-free random access of the radio communication system, the system band is increased; the transmission speed of the system is greatly increased.

(3) beam matching pair of the multi-beam communication is realized without increasing the interaction steps based on the initial communication interaction steps of the contention-free random access of the conventional radio communication system, and the service delay and the signaling overhead caused by the interaction of the parameters are reduced, the system efficiency is greatly increased.

(4) being applied into cell handover environment, by combining the beam matching pair process into the communication interaction process of cell handover, data transmission process is simplified, and the reliability of the multi-beam communication system random access and cell handover is increased.

(5) in the application environment that there is channel beam reciprocity, the beam sweeping matching way between the UE and the base station can simultaneously realize the function that the base station controls random access so as to implement the adjustment on base station side optimal matching beam pair direction and UE side optimal matching beam pair direction.

(6) in the process that the UE transmits preamble sequence by multi-beam and the base station detects preamble sequence by multi-beam sweeping, the transmitting or receiving beam direction range can be extended designed by using the current deployed beam direction as a baseline, thereby the flexible and success rate of beam matching pair are increased and system delay is reduced.

In several embodiments provided by the present invention, it should be understand that, the disclosed systems, devices and methods can be realized by other modes. For example, the device embodiment described above is merely schematic. For example, the classification of the unit is merely a logical function classification. Other classification modes can be provided while in the actual implementations. For example, a multiple of units or components can be combined or can be integrated to another system, or some features can be ignored, or cannot be executed. On the other point, the displayed or discussed coupling, directly coupling or communication connection between each other can be indirect coupling or communication connection of devices or units through some interfaces, which can be electrical, mechanical or other modes.

The unit as a separator for illustration can be separated physically or cannot be separated physically, the unit as a display component can be a physical unit or cannot be a physical unit, in other word, the display unit can located in one place, or the physical unit can be distributed to a multiple of network units. Part of units or all the units can be selected according to the actual requirement to realize the purpose of the embodiment.

Moreover, each of functional units in each embodiment of the present invention can be integrated into one process unit, or can exist in isolation as each unit physically, or can be integrated into one unit by at least two units. The above integrated unit can be realized using hardware, or can be realized using software functional unit.

Those skilled in the art can understand that part of the steps or the whole steps of the method of the embodiments can be completed by the indication of the related hardware according to the program. The program can be stored in a computer readable storage medium. The storage medium can comprises: Read Only Memory (ROM), Random Access Memory (RAM), Disc, CD or other storage mediums.

A mobile terminal provided in the present invention is described in detail. For those skilled in the art, according to the idea of embodiment of the present invention, there are changes on the specific implementations or application scopes. In conclusion, the content of the specification should not be understood as the limitation of the present invention.

The invention claimed is:

1. A method performed by a base station in a wireless communication system, the method comprising:
   identifying random access configuration information, the random access configuration information comprising first information on a number of repetition times m of subsequences included in a preamble sequence and second information on a number of random access transmission occasions n, wherein both of the m and the n are positive integers which are no less than 1;
   transmitting, to a terminal, the random access configuration information to indicate to the terminal to transmit one preamble sequence in each of the n random access transmission occasions, wherein each of the preamble sequences comprises m repeated subsequences;
   detecting, from the n random access transmission occasions, the m repeated subsequences included in each of the preamble sequences for each of the n random access transmission occasions;
   determining a random access transmission occasion from the n random access transmission occasions, according to a result of the detection; and
   transmitting, to the terminal, information on the optimal determined random access transmission occasion by using a random access response (RAR).

2. The method of claim 1,
   wherein the preamble sequences, each of which including the m repeated sequences, are transmitted by the terminal by using different transmitting beam directions at in the n random access transmission occasions, and
   wherein the detecting further comprises detecting the m repeated subsequences in each of the preamble sequences by sweeping m different receiving beam directions.

3. The method of claim 2, wherein the information on the determined random access transmission occasion comprises a random access transmission occasion index corresponding to a transmitting beam direction of the terminal according to the result of the detection.

4. The method of claim 2, further comprising:
   receiving, from the terminal, before the identifying of the random access configuration information, measurement result information for a reference signal;
   identifying whether the terminal is indicated to trigger a random access according to a measurement result included in the measurement result information; and
   in case that the terminal is indicated to trigger the random access, performing the identifying of the random access configuration information.

5. The method of claim 2,
   wherein the identifying of the random access configuration information further comprises: identifying, according to at least one of a beamforming gain strength with the terminal, a signal-to-interference-plus-noise ratio (SINR) of receiving signal feedback by the terminal, modulation and coding scheme (MCS), and the repetition times m, and
   wherein the m different receiving beam directions comprise receiving beam direction deployed for the terminal.

6. The method of claim 1, wherein the random access configuration information is transmitted to the terminal, based on a downlink control channel, a downlink shared channel, a physical broadcast channel, or a higher layer signaling configuration.

7. The method of claim 1, further comprising:
   receiving, before the identifying of the random access configuration information, a handover request message transmitted by another base station
   wherein the transmitting of the random access configuration information comprises:
   transmitting, by a handover request response message, the random access configuration information to the other base station, and
   requesting the other base station to transmit the random access configuration information to the terminal by a handover command message.

8. A method performed by a terminal in a wireless communication system, the method comprising:
   receiving, from a base station, random access configuration information comprising first information on a number of repetition times m of subsequences included in a preamble sequence and second information on a number of random access transmission occasions n, wherein both of the m and then are positive integers which are no less than 1;
   transmitting, to the base station, one preamble sequence in each of the n random access transmission occasions, wherein each of the preamble sequences comprises m repeated subsequences; and
   receiving, from the base station, information on a random access transmission occasion by using a random access response (RAR),
   wherein the random access transmission occasion is identified from the n random access transmission occasions according to a result of detecting the m repeated subsequences included in each of the preamble sequences for each of the n random access transmission occasions.

9. The method of claim 8,
wherein the preamble sequences, each of which including the m repeated subsequences, are transmitted to the base station by using n different transmitting beam directions in the n random access transmission occasions,
wherein the m repeated subsequences are detected, by the base station, in a each of the preamble sequences by sweeping m different receiving beam directions, and
wherein the information on the random access transmission occasion comprises a random access transmission occasion index corresponding to a transmitting beam direction of the terminal according to the result of the detection.

10. The method of claim 9, further comprising:
transmitting, to the base station before the receiving of the random access configuration information, measurement result information for a reference signal, to allow the base station to identify whether the terminal is indicated to trigger a random access according to a measurement result.

11. The method of claim 9,
wherein the random access configuration information further comprises information on a transmitting beam direction range, and
wherein the n different transmitting beam directions are within the transmitting beam direction range.

12. The method of claim 9, wherein the n different transmitting beam directions comprise transmitting beam direction deployed for the base station.

13. The method of claim 8, wherein the m repeated subsequences in each of the one or more preamble sequences are identical, and
wherein the random access configuration information is received based on a downlink control channel, a downlink shared channel, a physical broadcast channel, or by higher layer configuration information.

14. A base station in a wireless communication system, the base station comprising:
a transceiver configured to transmit and receive a signal; and
a controller coupled with the transceiver and configured to:
identify random access configuration information, the random access configuration information comprising first information on a number of repetition times m of subsequences included in a preamble sequence and second information on a number of random access transmission occasions n, wherein both of the m and then are positive integers which are no less than 1,
transmit, to a terminal, the random access configuration information to indicate to the terminal to transmit one preamble sequence in each of the n random access transmission occasions, wherein each of the preamble sequences comprises m repeated subsequences,
detect, from the n random access transmission occasions, the in repeated subsequences included in each of the preamble sequences for each of the n random access transmission occasions,
determine a random access transmission occasion from the n random access transmission occasions, according to a result of the detection, and
transmit, to the terminal, information on the optimal determined random access transmission occasion by using a random access response (RAR).

15. A terminal in a wireless communication system, the terminal comprising:
a transceiver configured to transmit and receive a signal; and
a controller coupled with the transceiver and configured to:
receive, from a base station, random access configuration information comprising first information on a number of repetition times m of subsequences included in a preamble sequence and second information on a number of random access transmission occasions n, wherein both of them and then are positive integers which are no less than 1,
transmit, to the base station, one preamble sequence in each of the n random access transmission occasions, wherein each of the preamble sequences comprises m repeated subsequences, and
receive, from the base station information on a random access transmission occasion by using a random access response (RAR),
wherein the random access transmission occasion is identified from the n random access transmission occasions according to a result of detecting the m repeated subsequences included in each of the preamble sequences for each of the n random access transmission occasions.

* * * * *